United States Patent
Kuespert

(10) Patent No.: US 10,641,919 B2
(45) Date of Patent: May 5, 2020

(54) PASSIVE CASED WELL IMAGE LOGGING

(71) Applicant: Jonathan Kuespert, Oklahoma City, OK (US)

(72) Inventor: Jonathan Kuespert, Oklahoma City, OK (US)

(73) Assignee: ROCK VISUALIZATION TECHNOLOGY, LLC, Oklahoma City, OK (US)

( * ) Notice: Subject to any disclaimer, the term of this patent is extended or adjusted under 35 U.S.C. 154(b) by 40 days.

(21) Appl. No.: 15/405,093

(22) Filed: Jan. 12, 2017

(65) Prior Publication Data

US 2018/0164469 A1 Jun. 14, 2018

Related U.S. Application Data

(60) Provisional application No. 62/434,162, filed on Dec. 14, 2016.

(51) Int. Cl.
*G01V 5/04* (2006.01)
*G01T 1/20* (2006.01)
*G01V 5/06* (2006.01)

(52) U.S. Cl.
CPC .................. *G01V 5/04* (2013.01); *G01T 1/20* (2013.01); *G01V 5/045* (2013.01); *G01V 5/06* (2013.01)

(58) Field of Classification Search
CPC .................................. G01V 5/06; G01V 5/045
See application file for complete search history.

(56) References Cited

U.S. PATENT DOCUMENTS

| | | |
|---|---|---|
| 2,316,361 A | 4/1943 | Piety |
| 2,464,930 A | 3/1949 | Herzog |
| 2,725,486 A | 11/1955 | Walstrom |
| 2,967,933 A | 1/1961 | Scherbatskoy |
| 4,286,217 A | 8/1981 | Planche et al. |
| 4,297,575 A | 10/1981 | Smith, Jr. et al. |

(Continued)

FOREIGN PATENT DOCUMENTS

| | | |
|---|---|---|
| EP | 0443936 A1 | 8/1991 |
| WO | 2015051287 A1 | 4/2015 |
| WO | 2016100755 A1 | 6/2016 |

OTHER PUBLICATIONS

Crain, E.R., Analysis of Dipmeter Logs Part 1—Evolution of Dipmeter Tools, Spectrum 2000 Mindware Ltd., Calgary AB Canada, Dipmeter Theory and Data Processing chapter of the Log Analysis Handbook, vol. 2, pp. 23-74, date unknown.

(Continued)

*Primary Examiner* — Michael C Bryant
(74) *Attorney, Agent, or Firm* — McAfee & Taft

(57) ABSTRACT

A method of creating a well image log of a cased well is provided. A passive cased well image logging tool assembly including a logging tool body, a plurality of gamma ray radiation sensors and a spatial positioning device is moved through at least a portion of the wellbore at a logging speed of no greater than 750 feet per hour. Corrected gamma ray radiation data is vertically sampled at a vertical distance sampling rate of once every vertical distance sampling interval, wherein the vertical distance sampling interval is no greater than 1.75 inches. Based on the sampled data, a well image log is prepared. A passive cased well image logging tool assembly for use in a cased well is also provided.

20 Claims, 11 Drawing Sheets

(56) References Cited

U.S. PATENT DOCUMENTS

| | | |
|---|---|---|
| 4,471,435 A | 9/1984 | Meisner |
| 4,503,328 A | 3/1985 | Neufeld |
| 4,585,939 A | 4/1986 | Arnold et al. |
| 4,587,423 A * | 5/1986 | Boyce .................. E21B 43/04 |
| | | 250/262 |
| 5,021,652 A * | 6/1991 | Arnold .................. G01T 1/20 |
| | | 250/256 |
| 5,619,411 A * | 4/1997 | Smith .................. G01V 5/12 |
| | | 702/8 |
| 6,026,911 A | 2/2000 | Angle et al. |
| 6,088,294 A | 7/2000 | Leggett, III et al. |
| 6,236,698 B1 * | 5/2001 | Hirukawa ............ G21C 17/108 |
| | | 376/245 |
| 6,467,341 B1 | 10/2002 | Boucher et al. |
| 6,766,855 B2 | 7/2004 | Snoga |
| 6,997,257 B2 | 2/2006 | Snoga |
| 7,000,700 B2 | 2/2006 | Cairns et al. |
| 7,081,616 B2 | 7/2006 | Grau et al. |
| 7,133,779 B2 | 11/2006 | Tilke et al. |
| 7,254,486 B2 | 8/2007 | Guo |
| 7,292,942 B2 | 11/2007 | Ellis et al. |
| 7,414,405 B2 | 8/2008 | Moore |
| 7,436,185 B2 | 10/2008 | Fredette et al. |
| 7,763,845 B2 | 7/2010 | Estes et al. |
| 8,201,625 B2 | 6/2012 | Almaguer |
| 8,648,309 B2 | 2/2014 | Smith, Jr. et al. |
| 2001/0041963 A1 | 11/2001 | Estes et al. |
| 2003/0085707 A1 | 5/2003 | Minerbo et al. |
| 2004/0020647 A1 | 2/2004 | Snoga |
| 2005/0199794 A1 | 9/2005 | Mickael |
| 2006/0149477 A1 | 7/2006 | Cairns et al. |
| 2007/0144740 A1 * | 6/2007 | Guo .................. G01V 5/104 |
| | | 166/254.2 |
| 2009/0256080 A1 | 10/2009 | DeVito |
| 2010/0314535 A1 * | 12/2010 | Zhang .................. G01V 5/101 |
| | | 250/252.1 |
| 2012/0186061 A1 | 7/2012 | Simonetti et al. |
| 2013/0261974 A1 | 10/2013 | Stewart et al. |
| 2014/0034821 A1 | 2/2014 | Evans et al. |
| 2014/0374582 A1 | 12/2014 | Guo et al. |
| 2016/0032717 A1 * | 2/2016 | Parker .................. E21B 47/01 |
| | | 367/7 |

OTHER PUBLICATIONS

Eilog Express and Imaging Logging System, China Petroleum Technology & Development Corporation, downloaded from the Internet at http://www.cptdc.com:8080/cptdc/do/cptdc/cptdc~2000_2030~0~01-0102-21366-3000_1010--.html, Jun. 29, 2016.

Younis, Shahbaz, Well Log (The Bore Hole Image) PowerPoint presentation, http://www.worldofteaching.com, date unknown.

Prosser, Jeremy et al., Early Dipmeters and New Tricks With Old Dips—Part 1, Task Geoscience, Aug. 17, 2011.

Borehole Imaging, http://petrowiki.org/Borehole_imaging, Jun. 8, 2016.

International Search Report and Written Opinion dated Feb. 14, 2018 in PCT/US17/66203, Jonathan Godard Kuespert.

International Search Report and Written Opinion dated Mar. 1, 2018 in PCT/US17/66156, Jonathan Godard Kuespert.

* cited by examiner

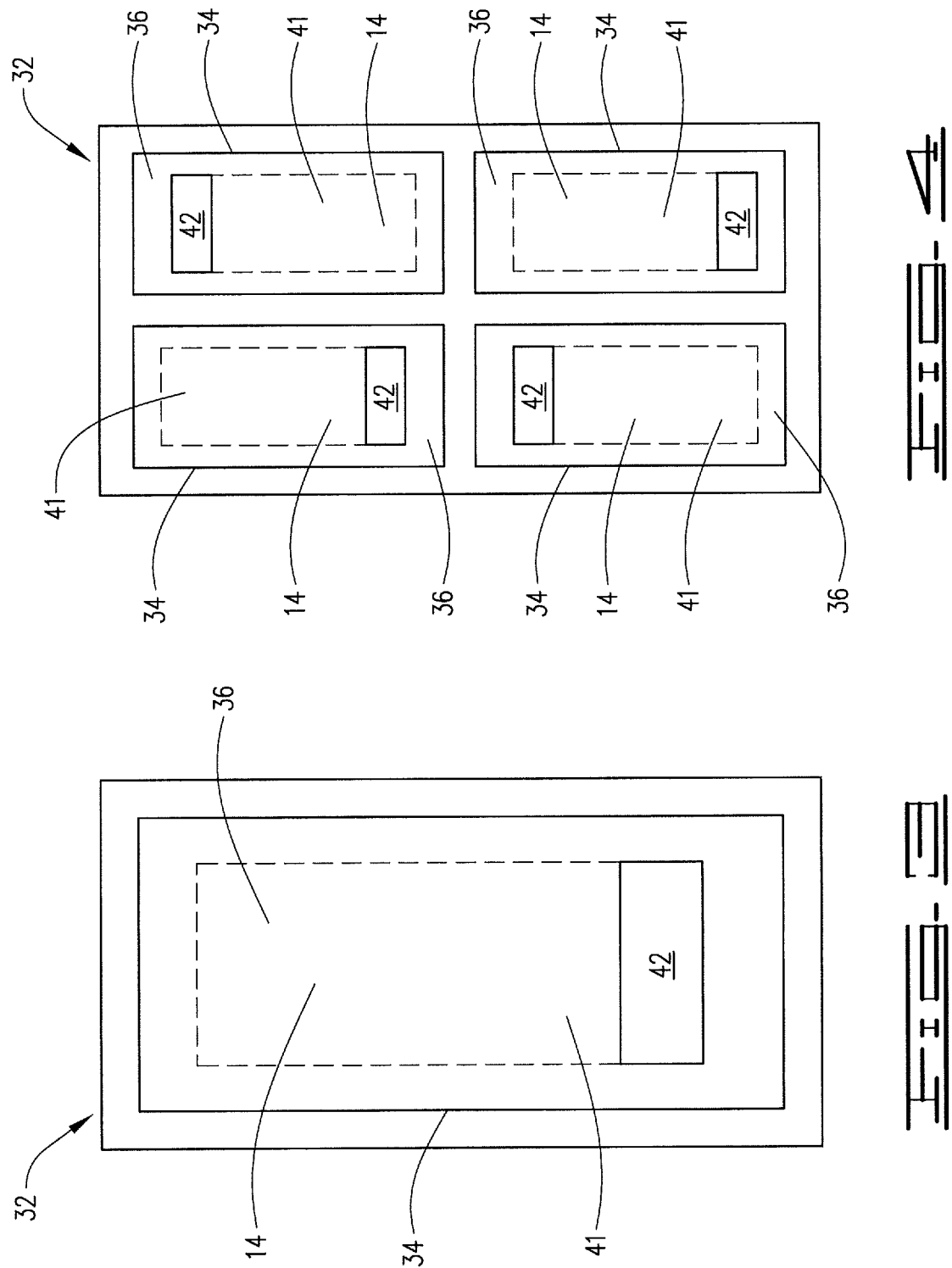

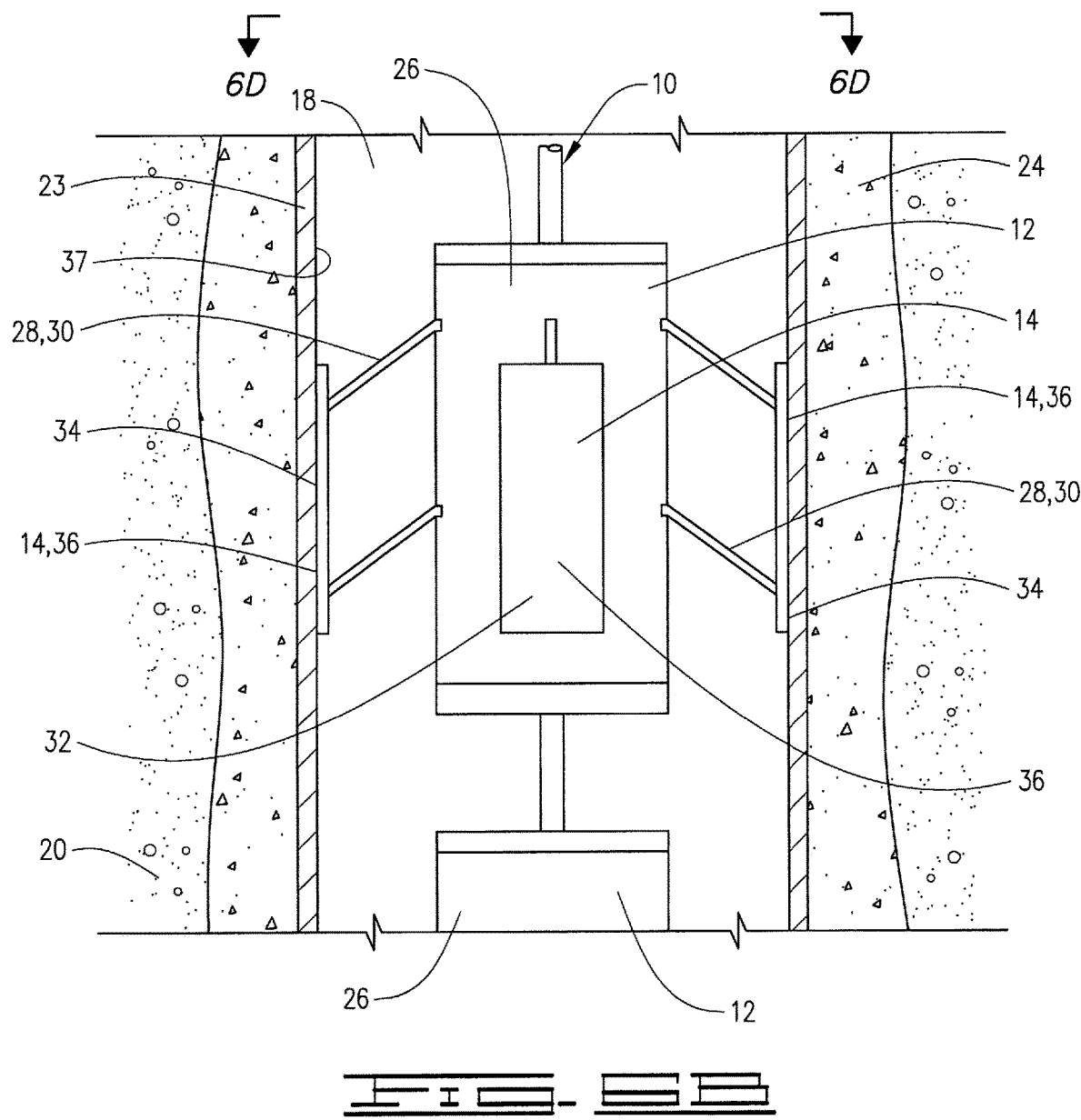

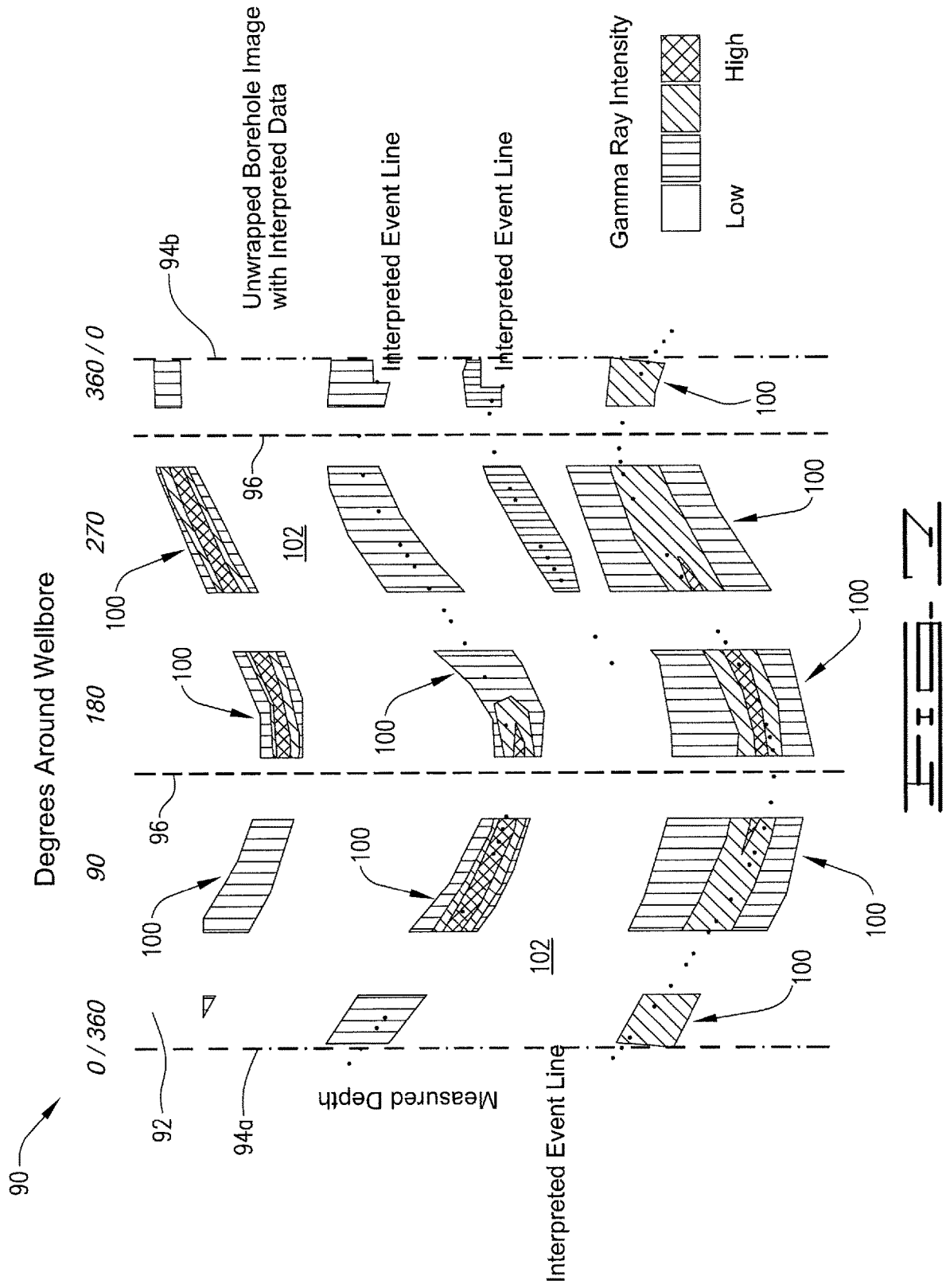

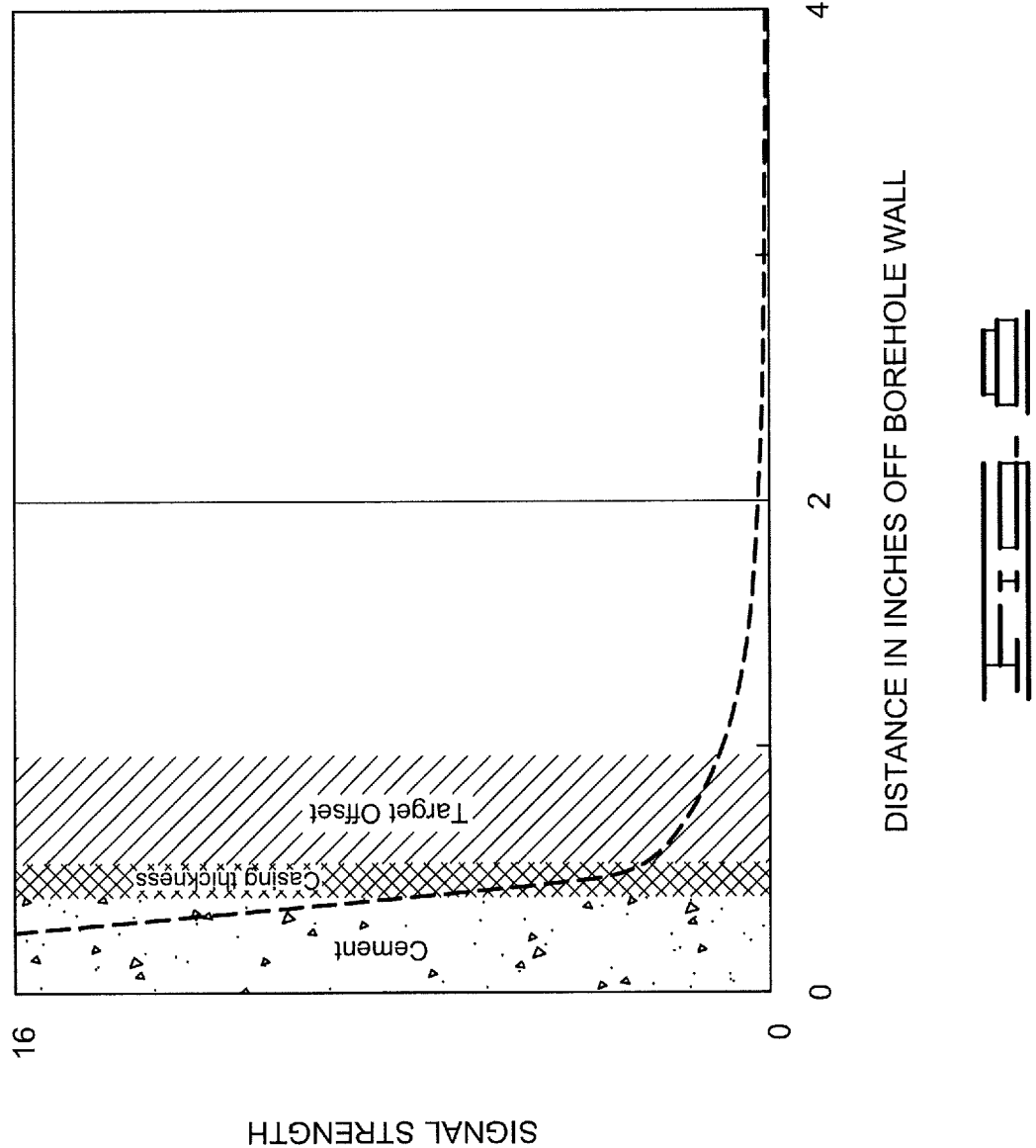

PASSIVE CASED WELL IMAGE LOGGING

CROSS-REFERENCE TO RELATED APPLICATION

This application claims the benefit of prior-filed U.S. provisional application No. 62/434,162 (filed on Dec. 14, 2016), which is incorporated by reference herein.

BACKGROUND

An oil and gas well is created by drilling a wellbore on a desired surface site that extends from the surface to a certain depth or distance into the ground. The wellbore penetrates the underlying earth and various geologic units therein. With proper planning and placement, one or more of the geologic units penetrated by the wellbore will include commercial quantities of hydrocarbons such as oil and gas. The wellbore can extend vertically, at an angle and/or horizontally through the earth. For various reasons, including rock and drilling heterogeneities, the actual direction of a wellbore tends to deviate at least to some extent from the intended direction of the wellbore. Also, the diameter and roughness (or "rugosity") of the resulting borehole typically changes as the wellbore is drilled because of similar rock and drilling heterogeneities.

As the wellbore is being drilled, a drilling fluid, also referred to as drilling mud, is continuously circulated from the surface through the wellbore and back to the surface. The drilling fluid functions to remove cuttings from the borehole, control formation pressure, and cool and lubricate the drill bit. After the wellbore is drilled to a certain or target depth, casing (typically metallic casing) is usually inserted and cemented in place in the now completed wellbore. The casing typically extends to the total depth ("TD") of the wellbore. The casing isolates and seals off various geologic zones that have been penetrated by the wellbore and serves multiple other purposes. Cement material is usually injected around the casing and allowed to harden into an annular sheath around the casing. The cement sheath physically supports, positions and protects the casing in the wellbore and bonds the casing to the walls of the wellbore such that the undesirable migration of fluids between zones or formations penetrated by the wellbore is prevented.

After the wellbore is drilled to the desired depth and cased, the well is ready for the final completion and production phases. Final completion of the well includes the creation of one or more access conduits (for example, perforations) that extend through the casing and cement sheath to provide communication between the wellbore and one or more of the geologic units from which hydrocarbons are to be produced. The casing and cement sheath provide a solid support for the access conduits. Once the well is completed, the gas and/or fluids, which may include hydrocarbons and water, are produced or allowed to flow from the now completed geologic unit(s) into the wellbore and then to the surface where they are processed for future use.

Numerous important procedures are typically carried out on a well during the well drilling phase and before the well completion phase. One of these procedures involves gathering geologic and engineering data regarding the size and configuration of the borehole and the nature and characteristics of the surrounding geologic units. The collection of such data, typically referred to as well logging or formation logging, can be performed by one of several downhole methods within the uncased wellbore, including mud logging, wireline logging with a wireline cable, or using the bit assembly for measurement-while-drilling ("MWD") or logging-while-drilling ("LWD") techniques. Various specialized logging tools have been developed for use in connection with each method. The particular method and type of tools utilized will depend on several factors, including the borehole inclination and condition, costs and time, and the type of geologic units penetrated by the wellbore.

In one downhole logging method, a logging tool is attached to the end of a wireline cable and lowered to the desired depth in the wellbore (for example, to the bottom of the wellbore) and then pulled back to the surface at a set rate or speed (the "logging speed"). Data is collected as the tool is pulled back to the surface and transmitted through the cable to the surface. In lieu of the wireline cable, for example, another downhole tool can be used to lower the logging tool into the wellbore and pull the logging tool out of the wellbore. The data is usually collected in a spatially-corrected fashion to increase the amount of true signal over the background noise. In order to make it easier to use, the data is typically also sampled at a particular sampling rate.

Well logging tools have been around for decades. For example, when well logging first began in the early 1900's, only spontaneous or ionic potential and resistivity data was recorded. Today, there are many different types of logging tool configurations available. Examples include spontaneous potential logging tools, resistivity/conductivity logging tools, image logging tools, acoustic logging tools and density/neutron logging tools. Most of the available logging tools are limited to use in an open-hole environment, although certain types of resistivity/conductivity logging tools and density/neutron tools can be used in both an open hole and a cased hole environment. The type of data collected and the manner in which it is collected varies from tool to tool.

An example of a modern logging tool is an image logging tool. An image logging tool is used to produce "images" of the borehole wall and the surrounding geologic units penetrated by the wellbore. For example, an image logging tool can be used to identify the dip and azimuth of the geologic units around the wellbore, locate rock breakouts within the borehole, identify fractures in the surrounding geologic units and determine the composition of the surrounding geologic units. Based on the data collected, a useful well image log can be created that represents the surface of the surrounding geologic units in the wellbore.

There are many factors that can alter the quality of the data collected and recorded by an image logging tool, including the logging speed, the sampling rate, the rate of turning or spiraling of the logging tool in the hole, the borehole contact with the sensors, the proximity of the sensors to the rock surface, the borehole internal diameter, the borehole shape or rugosity, the borehole inclination, the radial arrangement of the sensors, the number and orientation of the sensors, and the sensitivity of the sensors. For example, the logging speed, sampling rate and orientation at which data is collected can be particularly important factors. Based on the dip and azimuth of the wellbore and the surrounding rock, it may be determined, for example, that the final location to which the wellbore is drilled needs to be changed and that the current wellbore needs to be re-drilled, or even that an additional wellbore needs to be drilled from a different location on the site in order to effectively and efficiently penetrate the most promising geologic unit(s).

Well logging tools, including image logging tools, can be classified in many ways, including but not limited to active vs. passive, pad vs. non-pad, statistical vs. non-statistical, and centered vs. offset or eccentric. For example, an active well logging tool emits a signal (for example, nuclear radiation, energy waves or high energy particles) into the wellbore and the surrounding geologic units in order to induce a return signal that can be received and recorded by the same tool for later processing into useful data. A passive well logging tool, on the other hand, merely receives emitted signals that contain the useful information from the geologic units penetrated by the wellbore. A passive well logging tool does not emit a signal into the wellbore or geologic units.

The types of image logging tools in use today include micro-resistivity logging tools, acoustic logging tools, and optical logging tools. All of these tools are suitable for use in an open-hole environment. A micro-resistivity image tool is an active, non-statistical image logging tool that measures the conductivity/resistivity of rock minerals, fluids, gases and other materials in a geologic unit. An acoustic image logging tool is an active, non-statistical image logging tool that uses sonic waves that reflect off rock, fluid and other material surfaces. An optical image logging tool is an active, non-statistical image logging tool that uses cameras to image the rock, fluid and other material surfaces. Micro-resistivity image logging tools are the most common and widespread image logging tool in use today. All the major logging vendors have at least one micro-resistivity imager in their portfolio.

A micro-resistivity image logging tool uses a signal transmitter to emit a measured amount of electrical current through the borehole wall into the geologic units surrounding the wellbore. Multiple signal transmitters positioned around the tool to cover the entire area surrounding the wellbore are typically used. The current emitted by each signal transmitter is altered by the conductivity/resistivity of the rock minerals, fluids, gases and other materials that are adjacent to the wellbore. The altered current is then received by a corresponding return signal sensor attached to the logging tool. For example, the signal transmitters and return signal sensors can be placed in pads that are forced against the rock wall by extendable offset arms.

The time and distance interval between the emission of the current by each signal transmitter and the receipt of the altered current by the corresponding return signal sensor together with the properties of the return signals such as their amplitudes and/or phases can be used to determine the conductivity/resistivity of the materials in the geologic units, that is, the ability of the materials to resist electrical currents. The resulting formation micro-resistivity can be recorded, for example, as a function of the tool's depth or position in the wellbore. This data is then later processed to create a micro-resistivity well image log showing different properties of the geologic units surrounding the wellbore.

For example, the recorded resistivity of the rock and other materials in the geologic units can be used to determine the nature of the rock and other materials. For example, the resistivity of shale is different than the resistivity of sand, and hydrocarbons and water will also impact the signal and resulting data. The resistivity data can be very valuable in the search for hydrocarbons and can dictate how the drilling and/or completion programs move forward.

A very important component of any image logging tool is the spatial control of where the transmitters and signals are oriented in xyz space relative to the wellbore and the Earth. As used herein and in the appended claims, the "Earth" means the planet Earth. Over the last several decades, tremendous advances have been made in this area with the use of gyroscopes mounted inside the logging tool. Gyroscopes allow the data to be corrected in xyz space relative to the wellbore and the Earth to greatly improve the data quality. The corrected data allows an image of the wellbore and the surrounding geologic units to be produced that can be "unwrapped" to create a two dimensional or three dimensional view of the inside of the wellbore. Such a well image log can provide information regarding, for example, the formation lithology, the nature of the bedding, the content of fluid in the formation, and the dip and azimuth of the surrounding rock. The ability to view processed data in two-dimensional or three-dimensional space reduces the impact of poor data collection or processing errors due to faulty receivers, hole washouts, excessive tool spinning, insufficient receivers, poor sampling or high logging speeds. Thus, the quality of the final well image log is significantly enhanced.

The ultimate goal of any image logging tool is to get an accurate representation of characteristics of the geologic units surrounding the wellbore. One measure of the quality of the representation that can be obtained is the signal-to-noise ratio (the "S/N ratio") associated with use of the tool. Both the rock being penetrated and the logging tool used to record the data create noise, most of which is random and cannot be easily eliminated. Reducing the noise and maximizing the signal strength associated with any well logging tool is a primary objective in the design and use of the tool. Maximizing the S/N ratio of an image logging tool will also improve the final product.

The S/N ratio associated with an image logging tool can be increased, for example, by decreasing the logging speed, using an eccentric, offset or off-center arrangement of transmitter/sensor pads, moving the transmitter/sensor pads closer to the wellbore wall, increasing the number of signal transmitters and corresponding signal sensors attached to the logging tool, acquiring data in more accurate three-dimensional xyz space, and then later processing the data better in three-dimensional xyz space.

Due to the low S/N ratio associated with cased wellbores, micro-resistivity, acoustic and optical image logging tools are typically only effective in an open-hole (non-cased) wellbore. For example, when a metal casing has been cemented in the wellbore, the metal in the casing interferes with the electrical, acoustic or optical signals being sent and received by the tool. The highly conductive nature of the metal casing creates "noise" that can overwhelm both the tool and the rock signal to and from the tool. A solid casing of any type can make optical image logging tools worthless in looking at geologic or engineering features in the surrounding formation. For example, solid plastic and composite casings are opaque in nature which can negatively impact the performance of optical image logging tools. Optical image logging tools are also negatively impacted by opaque or otherwise dirty drilling fluids, even in open holes.

Drilling rigs are very expensive to own, rent and operate. When a well is being drilled or a drilling rig is otherwise in place, time is money. As a result, a great deal of effort is made to keep the drilling and completion process moving forward in a timely and cost-effective fashion. However, many problems can come up that slow the process and cost the operator time and money. For example, getting a logging tool stuck in an open wellbore before casing has been run can be very time consuming and otherwise counterproductive. For example, logging tools are often "fished out" of the wellbore by specialized subcontractors who are brought out to the well site on a rush basis. Fishing a stuck logging tool out of the wellbore can take several days of rig and subcontractor time to accomplish. A stuck logging tool of the type that contains an active radioactive source can activate regulatory requirements that the well be abandoned and filled with red cement (the red cement warns subsequent well drillers to stay away from the buried active radioactive source).

Depending upon the regulatory environment associated with the well, most completed oil and gas wells are ultimately cased (typically with a metal casing). As a result, electrical, acoustic and optic-based image logging tools are only useful before the casing is installed.

The nature of an open-hole environment can also negatively impact the performance of an image logging tool. For example, excessive mud-cake buildup on the borehole wall can interfere with the signals being transmitted and received by an image logging tool. For example, a permeable rock zone that absorbs drilling fluid may result in a thicker mud-cake buildup than an adjacent low permeability zone. Also, the nature of the drilling fluid in the wellbore of an uncased hole can interfere with the signals being transmitted and received by an image logging tool. For example, highly resistive or conductive drilling mud, including commonly used oil-based muds, can be problematic for micro-resistivity image logging tools. Logging in an oil-based mud hole with a micro-resistivity image logging tool can require more complex data collection and processing.

Also, due to the fact that micro-resistivity, acoustic and optical image well logging tools can only be used to evaluate the geology in unprotected open-hole environments, the tools are typically designed to be pulled out of the hole by a wireline cable at a relatively high logging speed, for example, at a logging speed of at least 1000 feet per hour ("FPH"), usually at about 1800 FPH, and sometimes up to 3600 FPH. When a well is being drilled, it is always important to get the well cased and otherwise completed as soon as possible. This is due primarily to the daily cost of having a drilling rig in place (even if the drilling phase is complete, the drilling rig is still often used to complete the well). Also, in many wells, it is important to case the wellbore or one or more portions thereof quickly due to changing well conditions. For example, in some cases, the wellbore wall is sloughing or the stability of the geologic units around the wellbore is otherwise decreasing with time. In order to prevent the wellbore from collapsing or caving in, a well operator may decide that casing needs to be put in place sooner as opposed to later.

Also, in an open-hole environment, the likelihood that changing pressures, changing borehole shapes and other conditions will cause an image logging tool to get stuck increases significantly at slower logging speeds. This problem is exacerbated by the outwardly biasing extendable arms and corresponding pads of modern micro-resistivity image logging tools which make it easier for such tools to get hung up on the rock wall, for example, due to deviations ("doglegs") in the inclination of the borehole. As a result, wireline logging engineers operating in open-hole environments are typically encouraged to use logging speeds of at least 1000 FPH and preferably 1,800 FPH.

Unfortunately, for a given image logging tool in a given wellbore environment, the quality of the logging data decreases as the logging speed at which the tool is run increases. A faster logging speed means a lower S/N ratio and less collected data. Less collected data means a lower quality final image log. In order to accommodate faster logging speeds and maximize image quality, image logging tool designers and manufacturers have increased the sophistication of the tools, including the number of pads and sensors on the tools, which allows a higher sampling rate to be used. Although this addresses the problem with low S/N ratios, it also significantly increases the cost of the tools. For example, a sophisticated micro-resistivity image logging tool can cost over $500,000 today.

The high cost of sophisticated modern image logging tools also creates problems in and of itself. For example, due to their high cost, micro-resistivity image logging tools are not widely available and can be in limited local supply. As a result, such tools may not be available to wireline logging engineers for use in a timely manner on a well. For example, additional planning and transportation costs may be incurred if the only available micro-resistivity image tool is located in another state.

The increased sophistication and capability of modern micro-resistivity image logging tools is not always needed. For example, in some cases, the well operator only needs or desires geologic unit dip and azimuth data. If this is the case, modern micro-resistivity image logging tools are used in a "dumbed-down" mode. In other words, the same expensive micro-resistivity image logging tool is run in the same deteriorating down-hole environment and records the same data, but only part of the data is processed and presented. This is very wasteful of the data acquisition time and costs, particularly in view of the risk of placing such an expensive tool into poor wellbore conditions and thereby risking the tool being stuck.

SUMMARY

In one aspect, a method of creating a well image log of a cased well is disclosed herein. The method comprises providing a passive cased well image logging tool assembly, and moving the logging tool assembly through at least a portion of the wellbore at a logging speed of no greater than 750 feet per hour. The logging tool assembly includes a logging tool body, a plurality of gamma ray radiation sensors attached to the logging tool body, each gamma ray radiation sensor being capable of continuously collecting gamma ray radiation data from one or more geologic units surrounding or adjacent to the wellbore as the logging tool assembly is moved through the wellbore, and at least one spatial positioning device attached to the logging tool body that is capable of continuously collecting sensor position data reflecting the xyz spatial position of the gamma ray radiation sensors in the wellbore relative to the wellbore and the Earth as the logging tool assembly is moved through the wellbore. The method further comprises: as the logging tool assembly is being moved through the wellbore, using the gamma ray radiation sensors to continuously collect gamma ray radiation data that is emitted by the geologic unit(s); as the logging tool assembly is being moved through the wellbore, using the spatial positioning device to continuously collect sensor position data reflecting the xyz spatial position of the gamma ray radiation sensors within the wellbore relative to the wellbore and the Earth; using the collected sensor position data to correct the collected gamma ray radiation data; vertically sampling the corrected gamma ray radiation data at a vertical distance sampling rate of once every vertical distance sampling interval, wherein the vertical distance sampling interval is no greater than 1.75 inches; and preparing a well image log based on the sampled gamma ray radiation data.

In another aspect, passive cased well image logging tool assembly for use in a cased well is disclosed herein. The passive cased well image logging tool assembly comprises: a logging tool body; a plurality of gamma ray radiation sensors attached to the logging tool body, each gamma ray radiation sensor being capable of continuously collecting gamma ray radiation data from one or more geologic units surrounding or adjacent to the wellbore as the logging tool assembly is moved through the wellbore; and at least one spatial positioning device attached to the logging tool body that is capable of continuously collecting sensor position data reflecting the xyz spatial position of the gamma ray radiation sensors in the wellbore relative to the wellbore and the Earth as the logging tool assembly is moved through the wellbore.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

FIG. 3 is an enlarged, front elevation view of one embodiment of a pad assembly of the passive cased well image logging tool assembly shown by FIGS. 1 and 2, illustrating the pad assembly in more detail.

FIG. 4 is an enlarged, front elevation view of another embodiment of a pad assembly of the passive cased well image logging tool assembly shown by FIGS. 1 and 2, illustrating the pad assembly in more detail.

FIG. 6B is an enlarged, detail view of a portion of FIG. 5 showing the passive cased well image logging tool assembly in an expanded position in the wellbore.

FIG. 6C is a cross-sectional view taken along the lines 6C-6C of FIG. 6A.

FIG. 6D is a cross-sectional view taken along the lines 6D-6D of FIG. 6B.

FIG. 7 is an example of a well log that can be generated using the method and passive cased well image logging tool assembly disclosed herein.

FIG. 8 is a graph illustrating the impact that the distance between the radiation sensors of the passive cased well image logging tool assembly disclosed herein and the borehole wall (e.g., the rock wall) adjacent to the outside surface of the casing has on the signal strength of the gamma ray radiation data collected by the tool assembly.

FIG. 9 is a graph illustrating the impact of the logging speed on the counting time associated with a given well image logging tool assembly.

DETAILED DESCRIPTION

Figure 1:
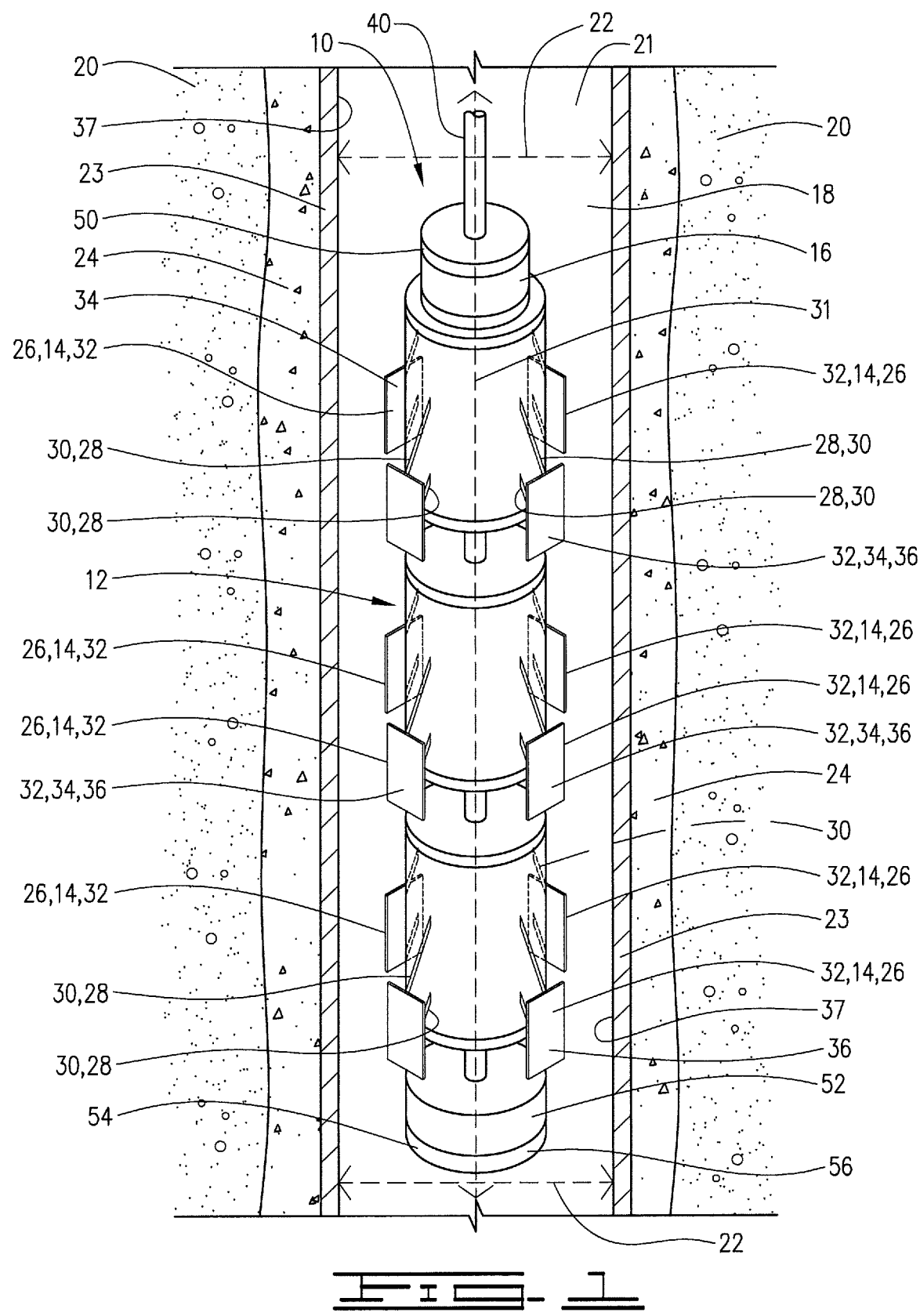
FIG. 1 is a perspective view of one embodiment of the passive cased well image logging tool assembly disclosed herein, showing the tool in a retracted position in a wellbore.

The present disclosure may be understood more readily by reference to this detailed description. Numerous specific details are set forth in order to provide a thorough understanding of the various embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

In one aspect, this disclosure provides a method of creating a well image log of a cased well. In another aspect, this disclosure provides a passive cased well image logging tool assembly for use in a cased well. For example, the passive cased well image logging tool assembly disclosed herein can be the passive cased well image logging tool assembly used in the method of creating a well image log of a cased well disclosed herein.

In one embodiment, the method of creating a well image log of a cased well disclosed herein comprises:

a. providing a passive cased well image logging tool assembly, the logging tool assembly including:
  a logging tool body;
  a plurality of gamma ray radiation sensors attached to the logging tool body, each gamma ray radiation sensor being capable of continuously collecting gamma ray radiation data from one or more geologic units surrounding or adjacent to the wellbore as the logging tool assembly is moved through the wellbore; and
  at least one spatial positioning device attached to the logging tool body that is capable of continuously collecting sensor position data reflecting the xyz spatial position of the gamma ray radiation sensors in the wellbore relative to the wellbore and the Earth as the logging tool assembly is moved through the wellbore;

b. moving the logging tool assembly through at least a portion of the wellbore at a logging speed of no greater than 750 feet per hour;

c. as the logging tool assembly is being moved through the wellbore, using the gamma ray radiation sensors to continuously collect gamma ray radiation data that is emitted by the geologic unit(s);

d. as the logging tool assembly is being moved through the wellbore, using the spatial positioning device to continuously collect sensor position data reflecting the xyz spatial position of the gamma ray radiation sensors within the wellbore relative to the wellbore and the Earth;

e. using the collected sensor position data to correct the collected gamma ray radiation data;

f. vertically sampling the corrected gamma ray radiation data at a sampling rate of once every sampling interval, wherein the sampling interval is no greater than 1.75 inches; and g. preparing a well image log based on the sampled gamma ray radiation data.

As used herein and in the appended claims, a "well" means a drilled wellbore and the geologic units surrounding or adjacent to the wellbore. The terms "wellbore" and "borehole" are used interchangeably and mean the same thing. A "cased well" means a well in which the wellbore or a section thereof contains an annular casing (for example, an annular metal casing). A "well image log" means a well log including an image of all or a portion of a borehole wall and all or a portion of one or more geologic units surrounding or adjacent to the wellbore. The well image log can be used to create a separate dipmeter log.

For example, the passive cased well image logging tool assembly used in the method disclosed herein can be the passive cased well image logging tool assembly disclosed herein and further described below. As used herein and in the appended claims, a "passive" cased well image logging tool assembly means a cased well image logging tool assembly that collects data from one or more geologic units surrounding or adjacent to a wellbore but does not transmit data into the wellbore or the geologic unit(s). Unless stated otherwise, one element "attached to" another element means the one element is directly or indirectly attached to, or incorporated into, the other element.

As used herein and in the appended claims, "collecting" data means receiving the data and transmitting the received data to another component. Receiving data, sensing data, and detecting data mean the same thing and may be used interchangeably herein. For example, the other component can be a signal processing unit, a memory device for storing data, or a relay. The other component can be located in the logging tool assembly itself or at another location (for example, on the surface). For example, "collecting" gamma ray radiation data means receiving gamma ray radiation data naturally emitted from a geologic unit surrounding or adjacent to the wellbore, and transmitting the received data to another component. For example, gamma ray radiation data can be transmitted by a gamma ray radiation sensor to a relay in the logging tool assembly and by the relay to a signal processing unit on the surface. For example, "collecting" sensor position data means receiving sensor position data reflecting the xyz spatial position of the gamma ray radiation sensors in the wellbore relative to the wellbore and the Earth, and transmitting the received sensor position data to another component. For example, sensor position data can be transmitted by the spatial positioning device to a relay in the logging tool assembly and by the relay to a signal processing unit on the surface.

For example, the signal processing unit, wherever it is located, can record (for example, store) the data and/or process it for further use. For example, the signal processing unit can be or include a central processing unit.

As used herein and in the appended claims, "gamma ray radiation" means gamma radiation arising from the radioactive decay of atomic nuclei. Gamma ray radiation includes gamma ray radiation that is naturally emitted from one or more geologic units surrounding or adjacent to the wellbore. Gamma rays consist of high energy protons and have short wavelengths, for example, less than one-tenth of a nanometer. Gamma ray radiation can be created by various sources including naturally occurring rock radioisotopes. Natural gamma rays can vary depending upon the type of element from which they are emitted. For example, different types of rock and other materials in a geologic unit emit different amounts and different spectra of natural gamma ray radiation. Examples of common naturally occurring rock radioisotopes in geologic units penetrated by wellbores include natural radioisotopes of uranium (U), potassium (K), and thorium (Th).

Gamma ray radiation is usually expressed in API (American Petroleum Institute) units or in parts per million (ppm). For example, the total gamma ray radiation emission from a geologic unit or portion thereof from natural radioisotopes of uranium, potassium, and thorium is typically expressed in API units. For standard gamma ray logs, the individual gamma ray radiation emissions from thorium and uranium radioisotopes in the geologic unit or portion thereof are typically expressed in parts per million, while the individual gamma ray radiation emission from potassium radioisotopes is typically expressed in terms of its bulk rock percentage. For example, the total gamma ray emission as well as the individual gamma ray emissions from thorium, uranium and potassium radioisotopes in a geologic unit or portion thereof can be collected by the logging tool assembly in accordance with the method disclosed herein.

According to an Oilfield Glossary provided by Schlumberger at "www.glossary.oilfield.slb.com" at the time of filing this application, an API unit is defined as:

"The unit of radioactivity used for natural gamma ray logs. This unit is based on an artificially radioactive concrete block at the University of Houston, Tex., USA, that is defined to have a radioactivity of 200 American Petroleum Institute (API) units. This was chosen because it was considered to be twice the radioactivity of a typical shale. The formation is the primary standard for calibrating gamma ray logs. However, even when properly calibrated, different gamma ray tools will not necessarily have identical readings downhole because their detectors can have different spectral sensitivities. They will read the same only if the downhole formation contains the same proportions of thorium, potassium and uranium as the Houston standard. For example, logging while drilling (LWD) tools have thicker housings than wireline tools, causing a different spectral response to the three sources of radioactivity, and therefore a different total gamma ray reading in some formations. The nuclear well log calibration facility at the University of Houston, known as the API pits, was opened in 1959 for the calibration of natural gamma ray and neutron logs. A facility for calibrating natural gamma ray spectroscopy logs was added later."

In connection with the method disclosed herein, the relative changes in the gamma ray values (in API units) with respect to gamma ray radiation emitted by a geologic unit are most important. The absolute values (in API units) of the gamma ray radiation emitted by the geologic units are not as important.

In the method disclosed herein, naturally occurring gamma ray radiation data can be analyzed to characterize, for example, rock or sediment in the geologic unit(s) surrounding or adjacent to the wellbore. As used herein and in the appended claims, "gamma ray radiation data" means data regarding one or more properties of gamma rays emitted from one or more geologic unit(s) surrounding or adjacent to the wellbore. Types of gamma ray radiation data that can be collected by the logging tool assembly in accordance with the method disclosed herein include the total natural gamma ray radiation emitted from a geologic unit or portion thereof, the individual energy profiles corresponding to the types of radioisotope elements (thorium, uranium and potassium) naturally emitting the gamma ray radiation and the intensity or magnitude of the gamma ray radiation. For example, the distance between the point of emission of the natural gamma ray radiation in the geologic unit and the gamma ray radiation sensor of the logging tool assembly that receives the emission can be collected as well. For example, the absolute value of a change in the intensity of the gamma ray radiation emitted from point to point in a geologic unit is as important as the magnitude of that change.

For example, shales usually emit more gamma rays than sands, sandstone and carbonate rocks because radioactive potassium is a common component in their clay content. The clay in shales often contains a higher amount of uranium and thorium isotopes. For example, black shale rich in organic compounds may emit far more gamma rays than clean sand because it has a higher uranium content. The following table shows typical gamma ray responses for different types of rocks, as expressed in API units:

| GAMMA RAY RESPONSE IN DIFFERENT ROCKS AND MINERALS (Expressed in API units) | |
| --- | --- |
| Type of Rock or Other Element | Typical Gamma Ray Values (API Units) |
| Limestone | 10-30 |
| Organic-rich shale | 70-250 |
| Sandstone | 10-60 |
| Salt | 2-20 |
| Shale | 70-90 |

As used herein and in the appended claims, the term "rock" includes rock, sediment, minerals and other elements in a geologic unit.

The gamma ray radiation data collected by the logging tool assembly in accordance with the method disclosed herein can be corrected, correlated and used to create useful well image logs. For example, the ability to differentiate between the sources of the gamma ray radiation naturally emitted from one or more geologic units allows spectral gamma ray logs to be created. For example, a spectral gamma ray log can have the total gamma ray response on the left column, and the separate responses from potassium, uranium and thorium radioisotopes on the right column. For example, the orientation and intensity/magnitude of the gamma ray radiation can be used to determine the nature of the materials in the geologic unit at each point in the unit from which the radiation is measured.

In addition to collecting gamma ray radiation data that is naturally emitted from one or more geologic units surrounding or adjacent to the wellbore, the well logging tool assembly used in the method disclosed herein can collect gamma ray radiation data emitted by radioactive tracers that have been injected into the wellbore to provide a way to analyze the placement and flow of fluids and materials in a geologic unit. For example, such gamma ray radiation data can be used to determine where a frac job has gone or where production is coming from in a subterranean formation.

As used herein and in the appended claims, a gamma ray radiation sensor means a receiver, sensor, detector, or other device that is capable of collecting gamma ray radiation data that is emitted from a geologic unit surrounding or adjacent to a wellbore. For example, the gamma ray radiation sensor can be a scintillation detector or counter configured to measure the number and energy of gamma rays. For example, each sensor can contain a crystal of a known chemical composition which is "excited" by the impact of electrons and emits photon pulses as a result thereof. The photon pulses can be counted. For example, the photon pulses can pass into a photo-multiplier tube assembly that increases the photon counts to a standardized magnitude.

As another example, the gamma ray radiation sensors can include crystal semiconductors formed of crystals having known properties that respond to gamma rays. For example, semiconductors formed of bismuth geranium crystals, gadolinium oxyorthosilicate crystals, cerium doped lutetium oxyorthosilicate crystals, thallium impurity, "NaI(Ti)" doped sodium iodide crystals, and any combination thereof can be used. Crystal semiconductors can have better intrinsic energy resolution than scintillators with respect to gamma ray radiation. For example, the gamma ray radiation sensors can detect gamma rays from isotope tracers, including Scandium 46, Antimony 124, and Iridium 192.

As used herein and in the appended claims, "sensor position data" means data that reflects the xyz spatial position of the gamma ray radiation sensors in the wellbore relative to the wellbore and the Earth as the logging tool assembly is moved through the wellbore. A "spatial positioning device" means a device that is capable of continuously collecting sensor position data. The spatial positioning device functions to orient the gamma ray radiation data collected by the well logging tool assembly into xyz space relative to the logging tool body. For example, the spatial positioning device can be used to correct the collected gamma ray radiation data to xyz space relative to the wellbore and the Earth. For example, the spatial positioning device allows for proper spatial xyz placement of the collected data. The correction process significantly improves the quality of the data provided by the logging tool assembly as well as the quality of the subsequently processed data.

For example, the spatial positioning device can be a gyroscope. For example, one or more gyroscopes can be attached to the logging tool body. Suitable gyroscopes for use in connection with the logging tool assembly disclosed herein are available from several vendors. One example of a suitable gyroscope device is sold by Scientific Drilling as a Gyro Measurement-While-Drilling (gyroMWD™) system. Another example of a suitable gyroscope device sold by Scientific Drilling is a "Keeper Gyro™."

In accordance with the method disclosed herein, various additional corrections can be made to the gamma ray radiation data to make it more accurate. For example, the method disclosed herein can further comprise processing the collected gamma ray radiation data to correct the data to account for the rugosity of the borehole, the thickness of the casing and optionally other parameters. For example, the rugosity of the borehole and the thickness of the casing and optionally one or more additional parameters can also be sensed by the well logging tool assembly disclosed herein or obtained from known data sources and used by the well logging tool assembly, together with the collected gamma ray radiation data, to correct the gamma ray radiation data.

As used herein and in the appended claims, the "logging speed" at which the logging tool assembly is moved through the wellbore (or a portion thereof) means the rate at which the logging tool assembly (including the sensors and other components attached thereto) is moved through the wellbore (or a portion thereof) in terms of distance units per time units, for example, the number of feet per hour ("FPH") that the logging tool is moved through the wellbore. For example, the logging tool assembly can be moved through the wellbore (or a portion thereof) at a logging speed in the range of from about 30 FPH to about 600 FPH. For example, the logging tool assembly can be moved through the wellbore (or a portion thereof) at a logging speed in the range of from about 60 FPH to about 300 FPH. For example, the logging tool assembly can be moved through the wellbore (or a portion thereof) at a logging speed in the range of from about 120 FPH to about 180 FPH. For example, the logging tool assembly can be moved through the wellbore (or a portion thereof) at a logging speed in the range of from about 160 FPH to about 170 FPH. For example, the logging tool assembly can be moved through the wellbore (or a portion thereof) at a logging speed of about 165 FPH.

The fact that the wellbore is cased allows a slower logging speed to be safely used. For example, due in large part to the fact that a drilling rig is usually no longer required, the cost of creating the well image log in a cased hole environment is significantly lower than it would be in an open hole environment. The ability to run the tool at a slower logging speed means a higher sampling rate can be used which means that more gamma ray radiation data can be collected with a less complex logging tool assembly (for example, as compared to modern micro-resistivity, acoustic or optical image logging tool assemblies).

For example, the corrected gamma ray radiation data can be vertically sampled by the signal processing unit or another component. The signal processing unit or other component can be located in the logging tool assembly itself or at another location (for example, as or as part of a central processing unit on the surface). The corrected gamma ray radiation data can be vertically sampled either as the method is carried out or at another time.

As used herein and in the appended claims, "vertically sampling" the corrected gamma ray radiation data means sampling the corrected gamma ray radiation data along the longitudinal axis of the wellbore. As understood by those skilled in the art, the longitudinal axis of the wellbore is not necessarily vertical—it can be horizontal or deviated at some angle between vertical and horizontal, either away from the surface or toward the surface. Accordingly, as used in the term "vertical sampling," the term "vertical" has no meaning other than along the longitudinal axis of the wellbore. The dimension in which the vertical sampling is carried out can be distance, time or some other dimension.

For example, the dimension in which the vertical sampling is carried out can be distance. As used herein and in the appended claims, the term "vertical distance sampling rate" means the rate at which samples of the data are taken with respect to the vertical distance sampling interval. The "vertical distance sampling interval" means the distance that the logging tool assembly moves through the wellbore for every sample that is collected. For example, if S represents the continuous stream of corrected gamma ray radiation data transmitted by the spatial positioning device, D represents the vertical distance sampling interval and the vertical sampling is performed by measuring the value of the S once every D inches, then the vertical distance sampling rate, R(d), at which the vertical sampling of S is carried out can be represented by the formula R(d)=1/D. Accordingly, if D is 1.75 inches, then R(d), is 0.57. For example, D is no greater than 1.75 inches. For example, D is in the range of from about 0.5 inches to 1.75 inches. For example, D can be in the range of from about 0.5 inches to about 1 inch.

For example, the dimension in which the vertical sampling is carried out can be time. As used herein and in the appended claims, the term "vertical time sampling rate" means the rate at which samples of the data are taken with respect to the vertical time sampling interval. The "vertical time sampling interval" means the time that the logging tool assembly moves through the wellbore for every sample that is collected. For example, if S represents the continuous stream of corrected gamma ray radiation data transmitted by the spatial positioning device, T represents the vertical time sampling interval and the vertical sampling is performed by measuring the value of the S once every T second, then the vertical time sampling rate, T(d), at which the vertical sampling of S is carried out can be represented by the formula T(d)=1/T. Accordingly, if T is 1.14 seconds, then the time vertical sampling rate, T(d), is 0.88. For example, T can be in the range of from about 0.25 seconds to about 20.0 seconds. For example, T can be in the range of from about 0.5 seconds to about 10.0 seconds. For example, T can be in the range of from about 0.6 seconds to about 4.0 seconds. For example, T can be in the range of from about 0.90 seconds to about 1.30 seconds. For example, T can be about 1.14 seconds.

The specific vertical sampling rate(s) utilized in a given survey, whether expressed in terms of distance, time or some other dimension, will vary depending on the logging speed used, the rock type, the wellbore geometry, the required accuracy and other factors as known to those skilled in the art with the benefit of this disclosure. For example, a statistically significant vertical sampling rate can be used.

The corrected gamma ray radiation data can also be horizontally sampled. Unlike vertical sampling, which collects data at points along or parallel to the longitudinal wellbore axis, horizontal sampling collects data at points outwardly and around with respect to the longitudinal wellbore axis (for example, perpendicularly or at some other angle with respect to the longitudinal wellbore axis). As understood by those skilled in the art, the longitudinal axis of the wellbore is not necessarily vertical—it can be horizontal or deviated at some angle between vertical and horizontal, either away from the surface or toward the surface. Accordingly, as used in the term "horizontal sampling," the term "horizontal" has no meaning other than outwardly and around the longitudinal axis of the wellbore.

Horizontal sampling can be a function of the number of sensors that are arranged around the logging tool assembly and the wellbore casing wall. It will vary depending on the tool configuration and the inside diameter of the casing. It is also impacted by the sensor window size and sensor orientation. Both vertical sampling and horizontal sampling are improved by slowing the logging tool down and increasing the number of sensors.

For example, the counting time associated with each gamma ray radiation sensor attached to the logging tool body can vary depending on the logging speed. As used herein and in the appended claims, the "counting time" associated with a gamma ray radiation sensor means the number of sensing seconds that the sensor uses to create a value. For example, a fast logging speed will cause the sensor to move across a portion of emitting rock in less time than a slower logging speed on the same rock. As a result, the counting time associated with the sensor will be higher with the slower logging speed.

As the counting time associated with a gamma ray radiation sensor attached to the tool body increases, the number of gamma ray emissions collected by the sensor also increases (assuming gamma rays are present at the time). As long as the counting time is the same across the sampling interval (for example, the vertical distance sampling interval or vertical time sampling interval), then the number of gamma ray emissions collected over that interval by the sensor will be relatively equal. However, if the logging speed changes across the sampling interval, then the number of gamma ray emissions collected over that interval by the sensor will change (due to the changing counting time as opposed to changing gamma ray emissions).

For example, the counting time associated with each gamma ray radiation sensor attached to the logging tool body is in the range from about 0.40 seconds per inch to about 60.00 seconds per inch. For example, the counting time associated with each gamma ray radiation sensor attached to the logging tool body is in the range from about 0.50 seconds per inch to about 12.00 seconds per inch. For example, the counting time associated with each gamma ray radiation sensor attached to the logging tool body is in the range from about 1.00 seconds per inch to about 4.00 seconds per inch. For example, at a logging speed of 165 FPH, the counting time associated with each gamma ray radiation sensor attached to the logging tool body can be about 1.83 seconds per inch.

For example, at least two gamma ray radiation sensors are attached to the logging tool body. For example, at least three gamma ray radiation sensors are attached to the logging tool body. The only limitation on the upper end of the number of gamma ray radiation sensors that can be attached to the logging tool body is practicality. For example, potentially over 100 gamma ray radiation sensors can be attached to the logging tool body. Multiple gamma ray radiation sensors will increase the S/N ratio associated with the logging tool assembly by improving both vertical and horizontal sampling.

For example, a sufficient number of gamma ray radiation sensors are attached to and equally spaced around and along the logging tool body to allow gamma ray radiation data to be collected at sufficient points around the circumference of the wellbore and an image log of an entire geologic unit surrounding the wellbore to be prepared. For example, eight gamma ray radiation sensors are attached to and equally spaced around and along the logging tool body. As will be understood by those skilled in the art with the benefit of this disclosure, the gamma ray radiation data at points between the sensors can be determined by interpolation of the data received by the sensors. For example, the gamma ray radiation sensors can be altered, modified, or focused to increase the S/N ratio allowing for collection of more accurate spatially correct data.

For example, the well image logging tool assembly can be moved through at least a portion of the wellbore in accordance with the disclosed method by lowering or otherwise moving the tool assembly to the bottom of the well, or another point in the wellbore, and then pulling the tool assembly toward the surface of the well. For example, the gamma ray radiation data can be collected from geologic unit(s) surrounding or adjacent to the wellbore as the tool assembly is pulled to the surface of the wellbore. For example, a wireline cable can be attached to the top of the image logging tool assembly and used to lower the tool assembly into the cased well and pull the image logging tool assembly toward the surface of the well at a pre-determined logging speed. As another example, the image logging tool assembly can be attached to a coiled tubing unit and moved through all or a portion of the cased hole. As will be understood by those skilled in the art with the benefit of this disclosure, other methods can also be used to move the image logging tool assembly through the wellbore as well.

A well image log based on the collected gamma ray radiation data can be prepared by standard methods known to those skilled in the art with the benefit of this disclosure. The gamma ray radiation data can be recorded, for example, as a function of the logging tool assembly's depth and position in the wellbore to create a gamma ray image log showing different properties of the geologic units.

For example, the method disclosed herein can further comprise creating a three dimensional image of one or more geological units penetrated by the wellbore based on the sampled gamma ray radiation data. The three dimensional image can be interpreted, for example, to determine the dip orientation and bedding azimuth in the geologic unit and/or the nature of the materials in the unit.

For example, an event plane (such as a bed boundary, fracture or fault) crossing the borehole at an angle would generate events at each sensor, and data reflecting these events can be collected at slightly different depths in the wellbore. The relative offset, and the radial and azimuthal positions of each sensor can then be used to compute dip relative to the logging tool body position. Increasing the measurement points provides the advantage of systematic redundancy, which allows the application of statistical error minimization techniques and higher S/N ratios.

Figure 2:
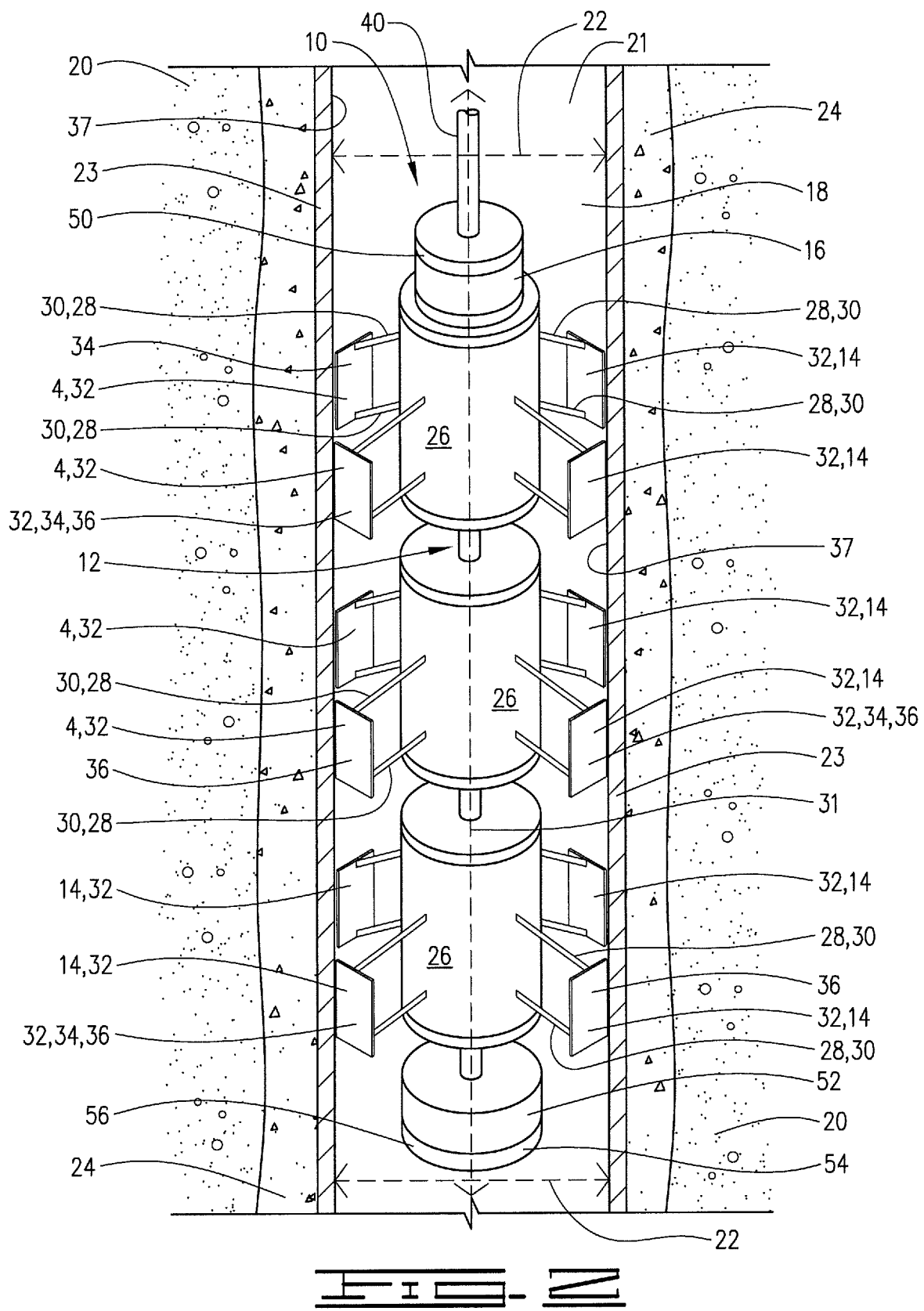
FIG. 2 is a perspective view of the embodiment of the passive cased well image logging tool assembly shown by FIG. 1, showing the tool in an expanded position in a wellbore.

Referring now to FIGS. 1 and 2 of the drawings, one embodiment of the passive cased well image logging tool assembly for use in a cased well disclosed herein and used in the method disclosed herein, generally designated by the reference numeral 10, will be described. The passive cased well image logging tool assembly 10 comprises a logging tool body 12, a plurality of gamma ray radiation sensors 14 attached to the logging tool body, and a spatial positioning device 16 attached to the logging tool body. Each gamma ray radiation sensor 14 is capable of continuously collecting gamma ray radiation data from one or more geologic units surrounding or adjacent to a wellbore as the logging tool assembly is moved through the wellbore. The spatial positioning device 16 is capable of continuously collecting sensor position data reflecting the xyz spatial position of the gamma ray radiation sensors in the wellbore relative to the Earth as the logging tool assembly is moved through the wellbore.

As shown by FIGS. 1 and 2, the logging tool assembly 10 is positioned downhole in a wellbore 18 that penetrates a subterranean formation 20. The wellbore 18 includes a borehole 21 that has a diameter 22. A casing 23 surrounds the wellbore 18 and borehole 21. A hardened cement sheath 24 surrounds the casing 23. For example, the casing 23 can be formed of metal.

Three receptor arm subassemblies 26 are attached to the logging tool body 12. The number of receptor arm subassemblies 26 attached to the logging tool body 12 can vary from one to more than three, with the only limit on the upper end of the range being practicality.

Each receptor arm subassembly 26 includes four extendable arm sets 28 attached thereto. Each extendable arm set 28 includes two individual arms 30. The extendable arm sets 28 are equally spaced radially around the logging tool body 12 and equidistantly offset from one another along the longitudinal axis 31 of the logging tool body. The number of extendable arm sets 28 attached to each receptor arm subassembly 26 can also vary. For example, at least three extendable arm sets 28 can be attached to each receptor arm subassembly 26 and equally spaced radially around and equidistantly offset along the longitudinal axis 31 of the logging tool body 12. For example, by having at least three extendable arm sets 28 attached to a receptor arm subassembly 26 and equally spaced radially around the logging tool body, the entire 360 degrees around the wellbore can be covered. By equidistantly offsetting the extendable arm sets 28 with respect to one another along the longitudinal axis 31 of the logging tool body 12, the coverage of the inside of the casing can be maximized. For example, in order to increase the detail of the covered area, eight extendable arm sets 28 can be attached to each receptor arm subassembly 26 and equally spaced radially around and equidistantly offset along the longitudinal axis 31 of the logging tool body 12. The number of extendable arm sets 28 attached to each receptor arm subassembly 26 can be the same or different.

Each extendable arm set 28 includes a pad subassembly 32 attached thereto. Each pad subassembly 32 includes a pad housing 34 having an outer flat face 36. At least one gamma ray radiation sensor 14 is attached to the outer flat face 36 of each pad subassembly 32. The number of pad subassemblies 32 attached to each extendable arm set 28, and/or the number of gamma ray radiation sensors 14 attached to each pad subassembly 32 can also vary. For example, multiple pad subassemblies 32 and/or multiple gamma ray radiation sensors 14 can be used. The number of pad subassemblies 32 attached to each extendable arm set 28 can be the same or different. Similarly, the number of gamma ray radiation sensors 14 attached to each pad subassembly 32 can be the same or different. Also, the position and orientation of the gamma ray radiation sensors 14 may vary from pad subassembly 32 to pad subassembly 32.

Each receptor arm subassembly 26 is operable to move the extendable arm sets 28 and pad subassemblies 32 attached thereto between a retracted position, as shown by FIG. 1, and an extended position, as shown by FIG. 2. In the retracted position, the logging tool assembly 10 can be more easily transported and lowered into and pulled out of the wellbore, as necessary. In the extended position, the pad subassemblies 32 are biased against the inside surface 37 of the casing 23. Specifically, the extendable arm sets 28 thereof are configured to extend from the receptor arm subassemblies 26 and the logging tool body 12 in a manner that places the outer faces 36 of the corresponding pad subassemblies 32 into contact with the inside surface 37 of the casing 23.

The extendable arm sets 28 are arranged 90° apart around the logging tool body 12. If three extendable arm sets 28 are used, they are arranged 120° apart around the logging tool body 12. Similarly, if five extendable arm sets 28 are used, they are arranged 72° apart around the logging tool body 12, and so forth and so on. Each extendable arm set 28 and pad subassembly 32 is equidistantly offset from one another along the longitudinal axis 31 of the logging tool body 12. Such an arrangement allows for the logging tool body 12 to be centered within the borehole 21 and for the corresponding pad subassemblies 32 to be biased against the inside surface 37 of the casing 23 thereby reducing one source of spatial error with respect to the collected gamma ray radiation data. The fact that each extendable arm set 28 and pad subassembly 32 is equidistantly offset from one another along the longitudinal axis 31 of the logging tool body 12 allows the coverage of the inside of the casing 23 to be maximized. For example, when every sensor 14 operates at a sampling interval of no greater than 1.75 inches, with at least three staggered pad subassemblies 32 and sensors 14 per extendable arm set 28, and more than one receptor arm subassembly 26 per tool, then an even greater decrease in the sample interval can be achieved with an increase in the S/N ratio.

An attachment assembly 40 for allowing the logging tool assembly 10 to be attached to the end of a cable wireline or coiled tubing, for example, is positioned at the top of the logging tool body 12. For example, as known to those skilled in the art, the attachment assembly 40 can have a structure that allows the end of a wireline cable to be attached thereto.

FIG. 3 illustrates one embodiment of a pad subassembly 32 in detail. At least one gamma ray radiation sensor 14 is positioned inside the pad housing 34. A radiation shield 41 is attached to the outer flat face 36 of the pad housing 34 over the gamma ray radiation sensor(s) therein. The radiation shield 41 includes a window 42 to allow gamma ray radiation to reach the gamma ray radiation sensor(s) 14 in the pad housing 34. The radiation shield 41 reduces the impact of the gamma ray radiation on the gamma ray radiation sensor(s) 14. For example, the radiation shield 41 can be formed of lead, gold, tungsten or similar radiation absorbing materials.

FIG. 4 illustrates another embodiment of a pad subassembly 32 in detail. In this embodiment, the pad subassembly 32 includes four gamma ray radiation sensors 14. Each gamma ray radiation sensor 14 is positioned inside the pad housing 34. A separate radiation shield 41 is attached to the outer flat face 36 of the pad housing 34 over each gamma ray radiation sensor 14 therein. Each radiation shield 41 includes a window 42 therein to allow gamma ray radiation to reach the gamma ray radiation sensors 14 in the pad housing.

For example, as discussed above, the spatial positioning device 16 can be a gyroscope. If desired, two or more gyroscopes or other spatial positioning devices 16 can be attached to the logging tool body 12.

A signal processing unit 50 is also attached to the logging tool body 12. As discussed above, alternatively, the signal processing unit can be positioned on the surface or at some other location. An omnidirectional gamma ray device 52 is also attached to the logging tool body. The omnidirectional gamma ray device 52 functions to provide a base line for offset normalization of gamma rays.

The well image logging tool assembly 10 also includes a centralized gamma ray radiation sensor 54 attached to the logging tool body 12 for detecting and receiving gamma ray radiation data. The sensor 54 is attached to an outside surface 56 of logging tool body 12. In an alternative embodiment (not shown), the sensor 54 can be housed by the logging tool body 12. If desired, two or more centralized gamma ray radiation sensors 54 can be used. The sensor(s) 54 can be the same type of sensor that is used as the sensors 14.

Although not shown by the drawings, the logging tool assembly 10 also includes a number of other components including one or more motors and related gears, circuits and systems (not shown) necessary to operate the logging tool assembly between its retracted position and extended position and allow the sensors to communicate with the signal processing unit (for example, to allow the sensors to transmit the data they collect and their position relative to the tool body to the signal processing unit), and to otherwise operate the tool as desired.

Figure 5:
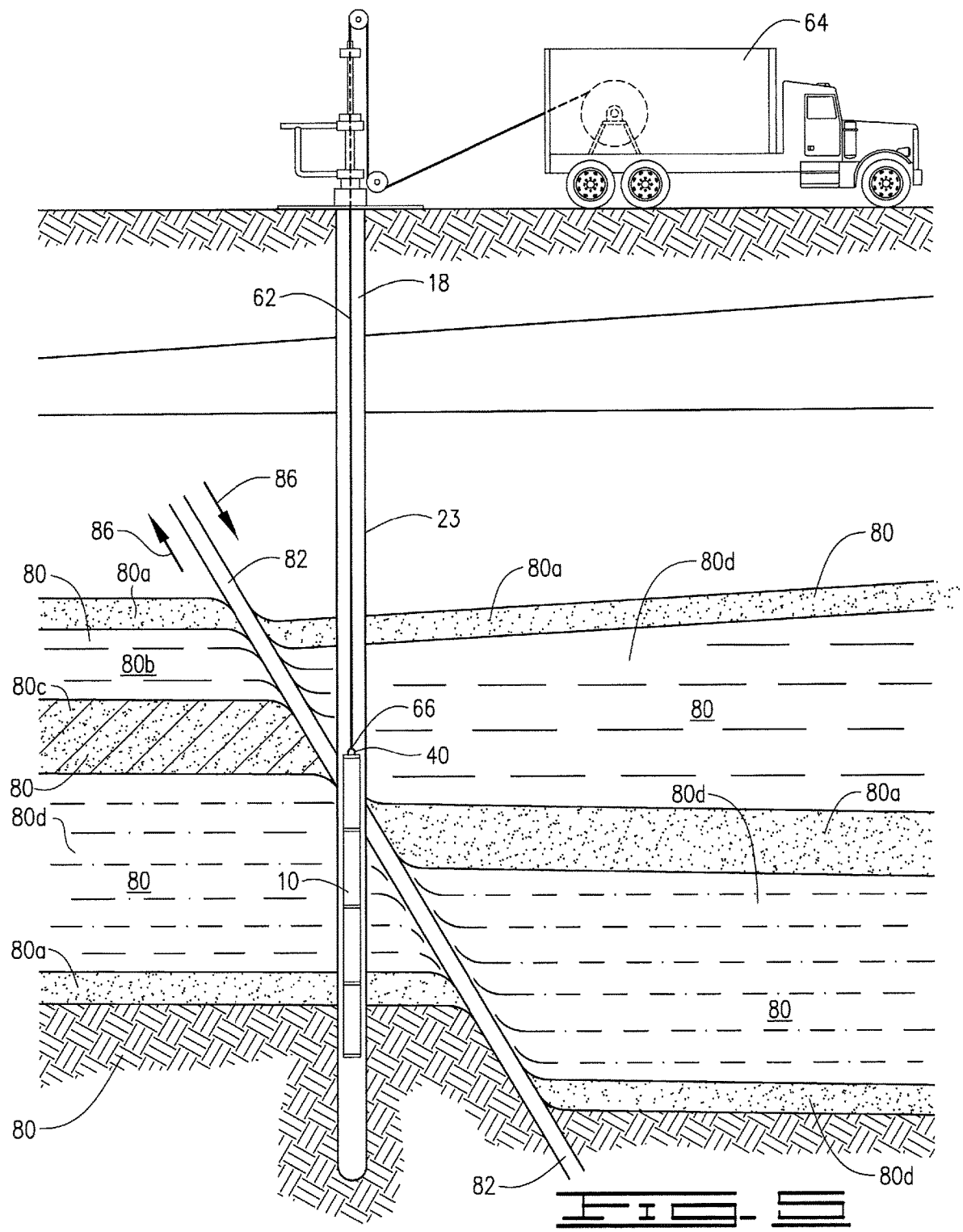
FIG. 5 is a schematic view illustrating use of the passive cased well image logging tool assembly shown by FIGS. 1 and 2 in association with one embodiment of the method disclosed herein.

Referring now to FIG. 5, an example of use of the passive cased well image logging tool assembly 10 in accordance with one embodiment of the method disclosed herein will be generally described. The logging tool assembly 10 is lowered into and pulled out of the wellbore 18 using a wireline cable 62 that is operated by a wireline or logging truck 64 in a manner that will be understood by those skilled in the art with the benefit of this disclosure. The attachment assembly 40 of the logging tool assembly 10 is attached to an end 66 of the wireline cable 62.

The annular casing 23 is cemented in place in the wellbore 18 to the total depth of the wellbore. An annular cement sheath surrounds the casing 23 (not shown in FIG. 5, but shown in FIGS. 1 and 2). The wellbore 18 is surrounded by a plurality of geologic units 80. As shown, the geologic units 80 include wet sand zones 80$a$, a shale zone 80$b$, a hydrocarbon-rich sand zone (pay zone) 80$c$, and a silty shale zone 80$d$. The geologic units 80 and the wellbore 18 are traversed by a normal fault 82 (a geological event). Motion/fault direction arrows 86 illustrate the direction of motion associated with the normal fault 82.

Figure 6A:
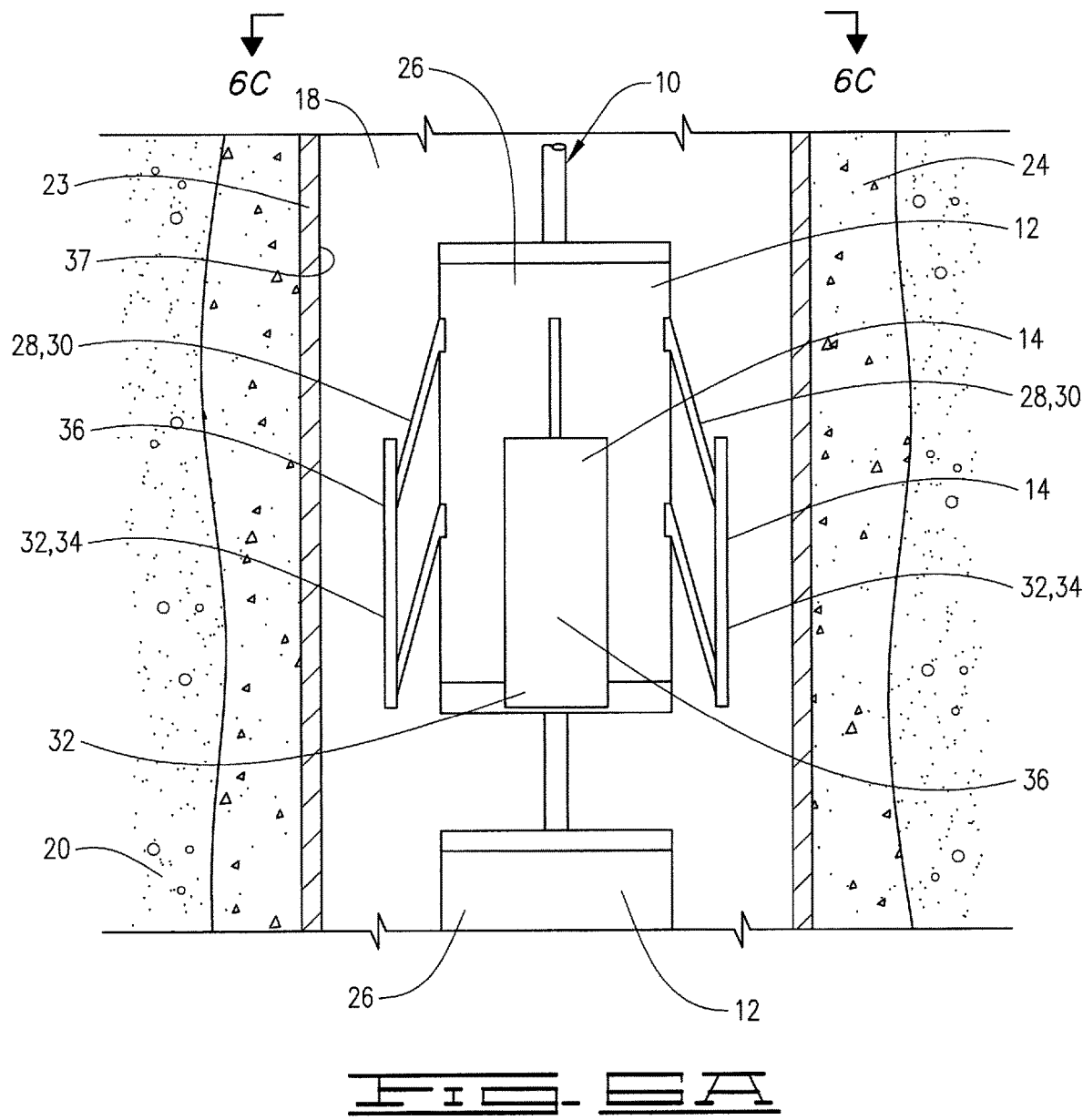
FIG. 6A is an enlarged, detail view of a portion of FIG. 5 showing the passive cased well image logging tool assembly in a retracted position in the wellbore.
Figure 5C:
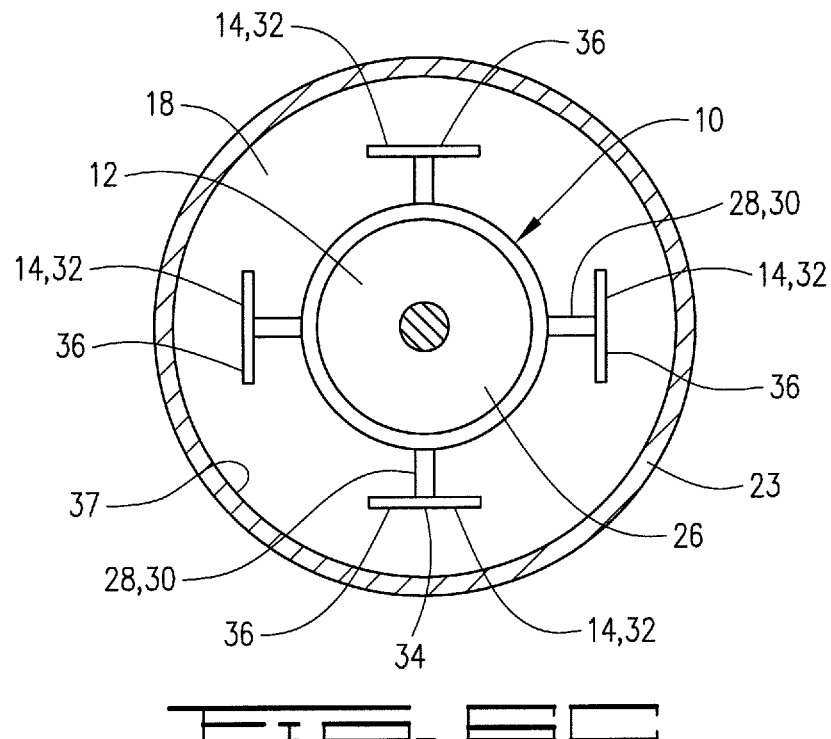
Figure 5D:
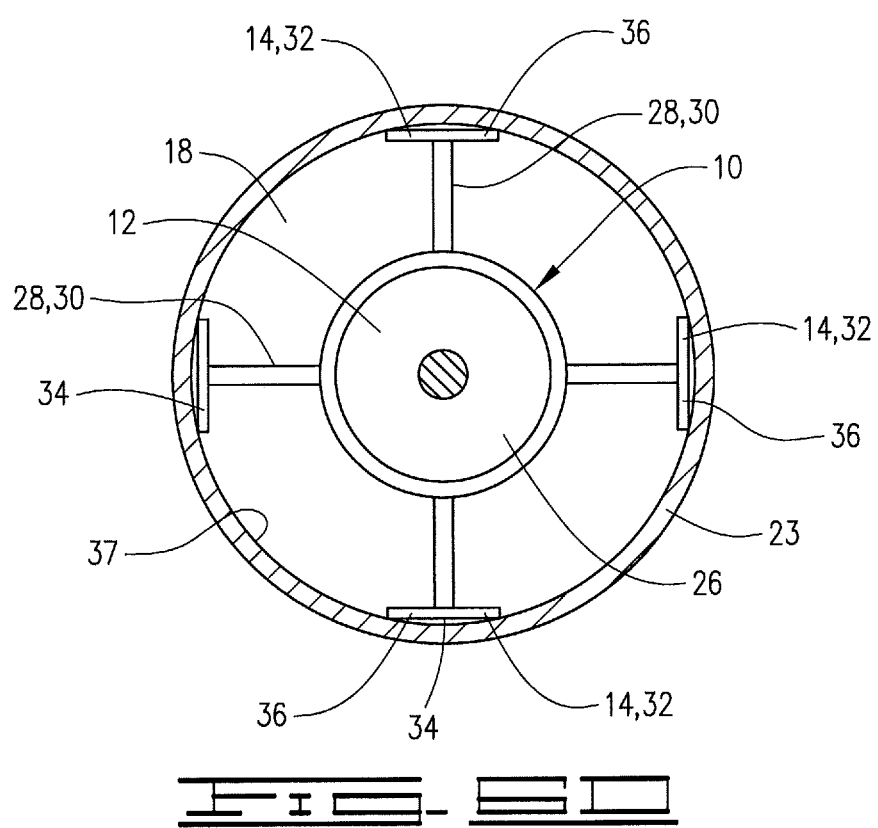
Figure 11:
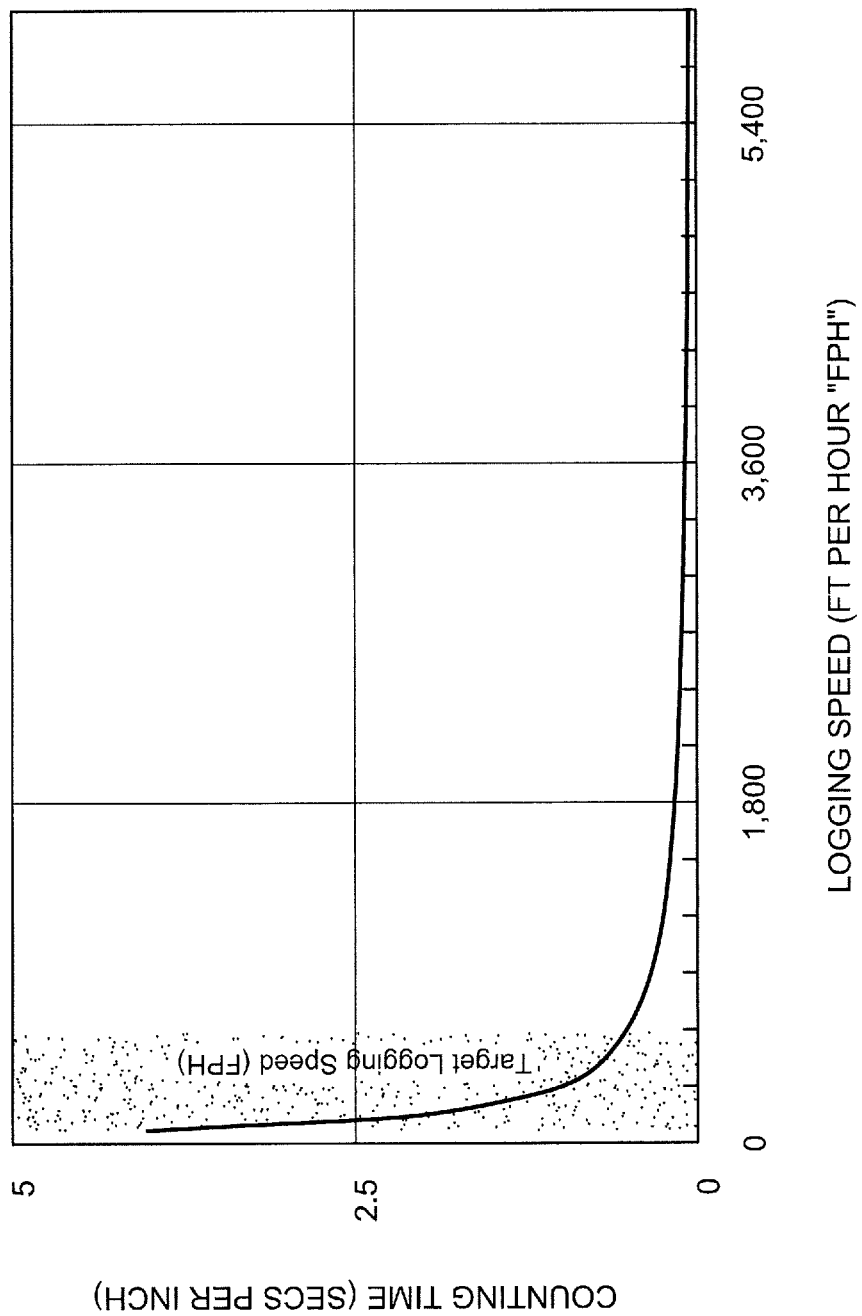

FIGS. 6A-6D further illustrate the logging tool assembly 10 in its retracted position and expanded position in a wellbore 18. FIGS. 6A and 6C show the tool in a retracted position, for example as the tool is being lowered to the desired depth in the wellbore 18. FIGS. 6B and 6D show the tool in an expanded position, for example as the tool is being pulled out of the hole at a desired logging speed. For example, once the tool assembly 10 reaches the desired depth in the wellbore 18, the extendable arm sets 28 and pad subassemblies 32 are expanded to bias the outer faces 36 of the pad subassemblies against the inside surface 37 of the casing 23. For example, the logging tool assembly 10 can be operated to move into its expanded position by sending a signal through the wireline cable 62 to the tool assembly 10.

Once the logging tool assembly 10 is in its expanded position, it is pulled out of the wellbore 18 by the wireline truck 64 and wireline cable 62 at a desired logging speed. While the tool assembly 10 is being pulled out of the wellbore 18 at the desired logging speed, it collects gamma ray radiation data using a desired counting time at a desired sampling rate. The data is corrected using data from the spatial positioning device 16 and otherwise processed in a manner that will be understood by those skilled in the art with the benefit of this disclosure. A well image log 90 is then prepared based on the collected data.

FIG. 7 is an example of a well image log 90 that can be created using the method and passive cased well logging tool assembly disclosed herein. As shown, the well image log 90 provides an unwrapped wellbore image 92 with interpreted data regarding the intensity of the gamma ray radiation at different points in the geologic units 80. Due to the fact the log 90 provides an "unwrapped view," what is seen on the 0/360 line 94a is also seen on the 360/0 line 94b. The image 92 includes structural axes 96 and several image tracks 100 across the wellbore 18. Increasing the number of pad subassemblies 32 and gamma ray radiation sensors 14 on the logging tool assembly 10 will decrease the blank spaces 102 between the tracks 100. An increase in the internal diameter 22 of the borehole 21 will widen the non-image tracks; however, for larger holes the tool may operate better if it includes additional extendable arm sets 28, pad subassemblies 32 and/or sensors 14. The final images can be used to interpret geologic events, boundaries, faults, fractures and dip and azimuth.

FIG. 8 is a graph illustrating an example of the impact that the distance between the gamma ray radiation sensors 14 and the borehole wall 37 has on signal strength of the gamma ray radiation data collected by the logging tool assembly 10. By placing the sensors 14 against the inside surface 37 of the casing 23 and centering the logging tool assembly 10 in the middle of the casing, the signal strength should increase by at least 3 to 6 times.

FIG. 9 is a graph illustrating an example of how decreasing the logging speed of the image logging tool assembly 10 can increase the counting time of the tool, allowing for more exposure to the gamma ray source and thereby increasing the signal strength and S/N ratio of the gamma ray radiation data that can be collected by the tool. For example, by using a logging speed of 300 FPH in accordance with the method disclosed herein, which is ⅙ of 1800 FPH (a typical logging speed used heretofore in association with micro-resistivity logging tools), the counting time can increase from approximately 0.20 seconds per inch to 3 to 4 seconds per inch, an increase in signal recording time of approximately 17 times. Compared to the highest recommended logging speed of 3,600 FPH, the proposed method increases the counting time by over 30 times.

Figure 10:
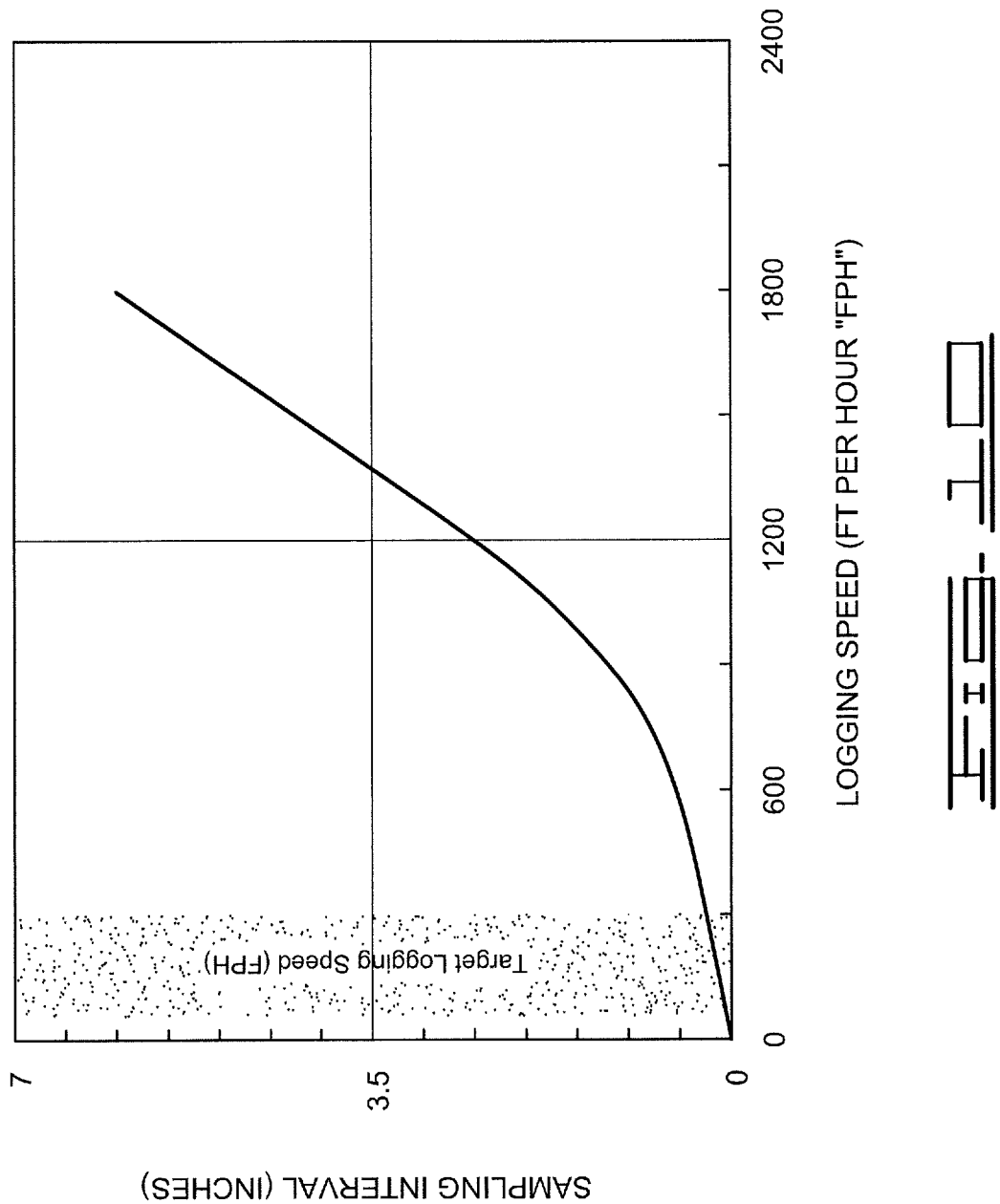
FIG. 10 is a graph illustrating an example of the likely minimum sampling rate possible in connection with a given well image logging tool assembly at various logging speeds.

FIG. 10 is a graph illustrating an example of the likely minimum sampling interval possible for the logging tool assembly 10 at various logging speeds. For example, at a logging speed of 1,800 FPH, a 6 inch sampling interval can be achieved. At a logging speed of 100 FPH to 300 FPH in accordance with the method disclosed herein, a lower sampling interval of 0.5 to 1 inch (and therefore a higher sampling rate) can be achieved.

Thus, by using the passive well image logging tool assembly disclosed herein in accordance with the disclosed method, a highly oriented logging survey can be conducted to collect useful wellbore and geologic unit data. For example, by combining a low logging speed with the minimum offset produced by multiple radially arranged radiation sensors biased against the inner wall of the wellbore casing, and eliminating interference by mud filter cake, drilling fluid and other factors that are present in an open-hole environment, better data can be collected in accordance with the disclosed method with a higher S/N ratio, which allows for the acquisition of more useable data resulting in an improved image and interpretation.

By detecting and receiving gamma ray radiation data emitted from geologic units surrounding or adjacent to the wellbore and using such data to generate a well image log, the method disclosed herein has many advantages over micro-resistivity, acoustical, optical and other image logging methods used heretofore. For example, using naturally-occurring gamma ray radiation data emitted from geologic units to derive the needed information allows a passive cased well logging tool to be used in a cased wellbore. Gamma ray radiation data (for example, from naturally occurring gamma rays or injected tracer gamma rays) can be collected without emitting any signal from the well logging tool assembly through the wellbore casing into the surrounding geologic units. As a result, the regulatory issues associated with using an active-source image logging tool assembly and the tremendous problems that can result if such a tool gets stuck (e.g., due to hole rugosity, differential pressure sticking, wellbore deviations or "dog-legs," and/or other material in the wellbore) can be avoided.

Perhaps most importantly, using naturally occurring gamma ray radiation data emitted from geologic units penetrated by the wellbore to derive the needed information allows the method disclosed herein to be carried out and the image logging tool disclosed herein to be used in connection with wellbores that have already been cased, for example, many years ago. For example, metal, plastic and composite casings do not interfere with naturally occurring gamma ray radiation transmitted from the geologic units through the wellbore to the image logging tool assembly disclosed herein. This creates numerous advantages over methods and well logging tool assemblies that directly measure the conductivity/resistivity or acoustic or optical properties of materials in the geologic units and therefore cannot be used in a cased well.

The method and image logging tool assembly disclosed herein can be used to create a well image log in a variety of different applications. For example, if a portion of the wellbore must be cased during the process of drilling a well (for example, due to unstable conditions caused by an unconsolidated zone), the well operator can 1) stop drilling, 2) pull the drilling bit assembly out of the hole, 3) run a "protective" casing string across the problem zone, 4) use the method and image logging tool assembly disclosed herein to log across that casing string, 5) run the drilling bit assembly back to the bottom of the newly cased hole, and 6) continue drilling. As another example, the method and image well logging tool assembly disclosed herein can be used in connection with active and inactive cased wells, and temporarily abandoned cased wells, including cased wells drilled decades ago and for which a well image log is not available. For example, the potential viability of an abandoned well for further production or re-drilling using new technology can now be evaluated. Cased wells in use or used in the past as water production wells and waste disposal wells can also be effectively evaluated.

For example, with the method and cased well image logging tool assembly disclosed herein, there are no problems due to mud-cake build up on the borehole wall, high formation fluid invasion into the surrounding rock unit, or the type of drilling fluid used in the wellbore. In most cases, because the well has already been cased, the high cost of having a drilling rig in place is not a factor. The fear that the wellbore will collapse or cave in is not a factor, which allows the data to be selectively collected at more optimal or non-critical times, thus further reducing costs and risks. The fear that the well logging tool will get stuck due to the shape and rugosity of the hole is not a factor. As a result, the needed data can be collected at a relatively slow logging speed and/or higher sampling rate as compared to the logging speed and/or sampling rate that is used in connection with other methods and well logging tools that are typically used in an open-hole environment.

In fact, the naturally occurring gamma ray radiation emitted by the rock and other elements in a geologic unit penetrated by the wellbore can be more accurately collected at a lower logging speed. For example, a gamma ray signal event boundary between sand and shale can be more accurately defined at a lower logging speed. The ability to collect the needed data at a relatively slow speed, for example, a speed no greater than 750 FPH, allows the data to be collected in accordance with the method and well logging tool disclosed herein in a manner that provides, for example, increased bed definition. This can be done without having to equip the well logging tool with a large number of highly sophisticated sensors and signal processors. As a result, the passive cased well image logging tool assembly disclosed herein does not have to be as robust, sophisticated or expensive as other well logging tools that are used in an open-hole environment and must consequently be operated at significantly higher logging speeds.

The S/N ratio associated with the method and passive cased well image logging tool assembly disclosed herein is significantly improved by using the tool assembly in a cased hole environment, by decreasing the logging speed and thereby increasing the sampling rate associated with the tool assembly. The S/N ratio associated with the method and passive cased well image logging tool assembly disclosed herein can be further improved by increasing the number of gamma ray radiation sensors attached to the tool assembly, using one or more gyroscopes to spatially correct the data collected by the tool assembly, radially aligning radiation sensors around the tool assembly to increase the coverage of surrounding geologic units, positioning the sensors in a more optimal pattern, and biasing the sensors against the interior surface of the casing by using extendable arms.

The fact that the method and tool assembly disclosed herein can be used in a cased well avoids the time constraints and costs associated with having a drilling rig in place and the limitations of an unstable wellbore or other conditions. Thus, the method and tool assembly can be safely used at a time when operational costs are less, time is more available and when the wellbore is not in danger of collapsing.

The method and tool assembly disclosed herein can be used to assess older cased wellbores, including horizontal wells, for possible re-drill and/or recompletion. The method and tool can add value to wells that have been stimulated by fracturing and/or acidizing techniques by providing the ability to qualitatively evaluate the stimulation results and identify any uncompleted pay zones or potential accumulations accessed by re-drilling.

What is claimed is:

1. A method of creating a well image log of a cased well having a casing with an inner diameter, comprising:
   providing a passive cased well image logging tool assembly, said logging tool assembly including:
      a logging tool body;
      a plurality of gamma ray radiation sensors attached to said logging tool body within the inner diameter of the casing, each gamma ray radiation sensor being capable of continuously collecting gamma ray radiation data from one or more geologic units surrounding or adjacent to the wellbore as said logging tool assembly is moved through the wellbore, wherein three or more of the gamma ray radiation sensors are attached to the logging tool body around a circumference of the tool body at an overlapping vertical location and two or more of the gamma ray radiation sensors are attached to the logging tool body at an overlapping radial location;
      a vertical and radial radiation shield at each radiation sensor that allows gamma ray radiation from a vertical and radial angular portion of a geologic unit to reach the sensor and reduces the effect of gamma ray radiation noise; and
      at least one spatial positioning device attached to said logging tool body that is capable of continuously collecting sensor position data reflecting the xyz spatial position of said gamma ray radiation sensors in the wellbore relative to the wellbore and the Earth as said logging tool assembly is moved through the wellbore;
   moving said logging tool assembly through at least a portion of the wellbore at a logging speed of no greater than 750 feet per hour;
   as said logging tool assembly is being moved through the wellbore, using said gamma ray radiation sensors to continuously collect gamma ray radiation data that is emitted by the one or more geologic units;
   as said logging tool assembly is being moved through the wellbore, using said spatial positioning device to continuously collect sensor position data reflecting the xyz spatial position of said gamma ray radiation sensors within the wellbore relative to the wellbore and the Earth;
   using said collected sensor position data to correct said collected gamma ray radiation data;
   vertically sampling said corrected gamma ray radiation data at a vertical distance sampling rate of once every vertical distance sampling interval, wherein said vertical distance sampling interval is no greater than 1.75 inches;
   interpolating gamma ray radiation data between the radiation sensors; and
   preparing a well image log based on said sampled gamma ray radiation data and interpolated gamma ray radiation data.

2. The method of claim 1, wherein said well image log is a spectral gamma ray log.

3. The method of claim 1, wherein said spatial positioning device is a gyroscope.

4. The method of claim 1, wherein said gamma ray radiation data that is continuously collected by said gamma ray radiation sensors is naturally emitted by the geologic units.

5. The method of claim 1, wherein said logging tool assembly is moved through at least a portion of the wellbore at a logging speed in the range of from about 30 feet per hour to about 600 feet per hour.

6. The method of claim 5, wherein said logging tool assembly is moved through at least a portion of the wellbore at a logging speed in the range of from about 60 feet per hour to about 300 feet per hour.

7. The method of claim 1, wherein said vertical distance sampling interval is in the range of about 0.5 inches to about 1.75 inches.

8. The method of claim 7, wherein said vertical distance sampling interval is in the range of about 0.5 inches to about 1 inch.

9. The method of claim 1, wherein the counting time associated with each gamma ray radiation sensor attached to said logging tool body is in the range of from about 0.40 seconds per inch to about 60.00 seconds per inch.

10. The method of claim 1, wherein said gamma ray radiation sensors are attached to and equally spaced around said logging tool body.

11. The method of claim 10, wherein a sufficient number of gamma ray radiation sensors are attached to and equally spaced around and along the logging tool body to allow gamma ray radiation data to be collected at sufficient points around the circumference of the wellbore and an image log of an entire geologic unit surrounding the wellbore to be prepared.

12. The method of claim 1, wherein said cased well is inactive.

13. The method of claim 12, wherein said cased well is an inactive well for which a well image log is not available.

14. A method of creating a well image log of a cased well having a casing with an inner diameter, comprising:
  providing a passive cased well image logging tool assembly, said logging tool assembly including:
    a logging tool body;
    a plurality of gamma ray radiation sensors attached to and equally spaced around said logging tool body within the inner diameter of the casing, each gamma ray radiation sensor being capable of continuously collecting gamma ray radiation data that is naturally emitted by one or more geologic units surrounding or adjacent to the wellbore as said logging tool assembly is moved through the wellbore, wherein three or more of the gamma ray radiation sensors are attached to the logging tool body around a circumference of the tool body at an overlapping vertical location and two or more of the gamma ray radiation sensors are attached to the logging tool body at an overlapping radial location;
    a vertical and radial radiation shield at each radiation sensor that allows gamma ray radiation from a vertical and radial angular portion of a geologic unit to reach the sensor and reduces the effect of gamma ray radiation noise; and
    at least one gyroscope attached to said logging tool body that is capable of continuously collecting sensor position data reflecting the xyz spatial position of said gamma ray radiation sensors in the wellbore relative to the wellbore and the Earth as said logging tool assembly is moved through the wellbore;
  moving said logging tool assembly through at least a portion of the wellbore at a logging speed of about 30 feet per hour to about 600 feet per hour;
  as said logging tool assembly is being moved through the wellbore, using said gamma ray radiation sensors to continuously collect gamma ray radiation data that is emitted by the one or more geologic units;
  as said logging tool assembly is being moved through the wellbore, using said spatial positioning device to continuously collect sensor position data reflecting the xyz spatial position of said gamma ray radiation sensors within the wellbore relative to the wellbore and the Earth;
  using said collected sensor position data to correct said collected gamma ray radiation data;
  vertically sampling said corrected gamma ray radiation data at a vertical distance sampling rate of once every vertical distance sampling interval, wherein said vertical distance sampling interval in the range of about 0.5 inches to about 1.75 inches;
  interpolating gamma ray radiation data between the radiation sensors; and
  preparing a well image log based on said sampled gamma ray radiation data and interpolated gamma ray radiation data.

15. The method of claim 14, wherein said well image log is a spectral gamma ray log.

16. The method of claim 14, wherein said logging tool assembly is moved through at least a portion of the wellbore at a logging speed in the range of from about 60 feet per hour to about 300 feet per hour.

17. The method of claim 14, wherein said vertical distance sampling interval is in the range of about 0.5 inches to about 1 inch.

18. The method of claim 14, wherein the counting time associated with each gamma ray radiation sensor attached to said logging tool body is in the range of from about 0.40 seconds per inch to about 60.00 seconds per inch.

19. The method of claim 14, wherein a sufficient number of gamma ray radiation sensors are attached to and equally spaced around and along the logging tool body to allow gamma ray radiation data to be collected at sufficient points around the circumference of the wellbore and an image log of an entire geologic unit surrounding the wellbore to be prepared.

20. The method of claim 14, wherein said cased well is an inactive well for which a well image log is not available.

* * * * *